(12) United States Patent
Ishigami et al.

(10) Patent No.: US 10,746,551 B2
(45) Date of Patent: Aug. 18, 2020

(54) POSITIONING APPARATUS AND POSITIONING METHOD

(71) Applicant: Mitsubishi Electric Corporation, Tokyo (JP)

(72) Inventors: Tadatomi Ishigami, Tokyo (JP); Takashi Irie, Tokyo (JP); Masatoshi Fujii, Tokyo (JP); Kohei Fujimoto, Tokyo (JP); Norihiro Nishiuma, Tokyo (JP); Atsushi Mori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 395 days.

(21) Appl. No.: 15/754,195

(22) PCT Filed: Oct. 15, 2015

(86) PCT No.: PCT/JP2015/079155
§ 371 (c)(1),
(2) Date: Feb. 21, 2018

(87) PCT Pub. No.: WO2017/064790
PCT Pub. Date: Apr. 20, 2017

(65) Prior Publication Data
US 2018/0245924 A1    Aug. 30, 2018

(51) Int. Cl.
*G01C 21/16* (2006.01)
*G01S 19/40* (2010.01)
(Continued)

(52) U.S. Cl.
CPC .......... *G01C 21/165* (2013.01); *G01C 23/00* (2013.01); *G01S 19/40* (2013.01); *G01S 19/49* (2013.01); *G01P 15/18* (2013.01); *G01S 19/52* (2013.01)

(58) Field of Classification Search
CPC ....... G01S 19/52; G01S 19/40; G01C 21/165; G01P 15/18
See application file for complete search history.

(56) References Cited

U.S. PATENT DOCUMENTS 6,029,111 A * 2/2000 Croyle ................. G01C 21/165
                                                          701/468
9,026,263 B2 * 5/2015 Hoshizaki ............ G01C 21/165
                                                          701/1

(Continued)

FOREIGN PATENT DOCUMENTS

JP    9-243385 A     9/1997
JP   10-332415 A    12/1998
(Continued)

OTHER PUBLICATIONS

International Search Report (PCT/ISA/210) issued in PCT/JP2015/079155, dated Dec. 28, 2015.

*Primary Examiner* — Gregory C. Issing
(74) *Attorney, Agent, or Firm* — Birch, Stewart, Kolasch & Birch, LLP

(57) ABSTRACT

A positioning apparatus according to the present invention includes: a triaxial acceleration sensor zero point calculating unit which determines whether or not the moving body is performing horizontal plane uniform linear traveling, and calculates a zero point of the triaxial accelerations when a determination is made that the moving body is performing the horizontal plane uniform linear traveling, based on at least triaxial speeds, a longitudinal acceleration, and triaxial accelerations while the moving body is traveling; an apparatus housing attachment angle calculating unit which calculates a pitch direction attachment angle and a roll direction attachment angle based on the zero point of the triaxial accelerations; a triaxial angular velocity coordinate transforming unit which coordinate-transforms the triaxial angu- (Continued)

lar velocities; and a position estimating unit which estimates a current position of the moving body based on at least a yaw rate obtained from the triaxial angular velocities.

14 Claims, 15 Drawing Sheets

(51) Int. Cl.
  *G01S 19/49* (2010.01)
  *G01C 23/00* (2006.01)
  *G01S 19/52* (2010.01)
  *G01P 15/18* (2013.01)

(56) References Cited

U.S. PATENT DOCUMENTS

| | | |
|---|---|---|
| 9,217,757 B2 * | 12/2015 | Hergesheimer ......... G01P 21/00 |
| 2008/0294342 A1 * | 11/2008 | Hoshizaki ............... G01S 19/47 |
| | | 701/472 |
| 2012/0330497 A1 * | 12/2012 | De Tommasi ....... G01C 21/165 |
| | | 701/33.1 |
| 2016/0327654 A1 * | 11/2016 | Kumabe ................. G01S 19/49 |

FOREIGN PATENT DOCUMENTS

| | | | |
|---|---|---|---|
| JP | 2011-209162 A | 10/2011 | |
| WO | WO-2015104757 A1 * | 7/2015 | ............. G01S 19/52 |

\* cited by examiner

POSITIONING APPARATUS AND POSITIONING METHOD

TECHNICAL FIELD

The present invention relates to a positioning apparatus and a positioning method for a moving body.

BACKGROUND ART

A positioning apparatus of a vehicle (moving body) estimates a vehicle position and attitude angles by using a Global Navigation Satellite System (GNSS) receiver and various sensors. When an angular velocity sensor and an acceleration sensor whose detection axes are inclined in a pitch direction or a yaw direction are used, the positioning apparatus needs to consider each characteristic of the angular velocity sensor and the acceleration sensor. Further, when a housing of the positioning apparatus is installed in the vehicle body while inclining at a predetermined attachment angle, it is necessary to consider the attachment angle of the positioning apparatus.

Conventionally, a technique of calculating an attachment angle of a positioning apparatus is disclosed (for example, see Patent Documents 1 to 3).

PRIOR ART DOCUMENTS

Patent Documents

Patent Document 1: Japanese Patent No. 3,375,268
Patent Document 2: Japanese Patent No. 2,843,904
Patent Document 3: Japanese Patent Application Laid-Open No. 2011-209162

SUMMARY

Problem to be Solved by the Invention

Conventionally, it is not always possible to estimate the subject vehicle position regardless of the attachment angle of the positioning apparatus.

The present invention has been made to solve such a problem, and an object of the present invention is to provide a positioning apparatus and a positioning method capable of estimating an subject vehicle position regardless of the attachment angle of the positioning apparatus.

Means to Solve the Problem

To solve the above problem, a positioning apparatus according to the present invention is a positioning apparatus of a moving body, the apparatus including: a GNSS receiver which receives a radio wave from a GPS satellite, calculates at least a current position of the moving body and triaxial speeds including a longitudinal direction speed, a lateral direction speed, and a vertical direction speed, which are speeds of three axes orthogonal to each other in the positioning apparatus, and outputs a calculation result as a positioning result; a speed sensor which outputs a pulse signal corresponding to movement of the moving body; a triaxial angular velocity sensor which detects triaxial angular velocities which are angular velocities of the three axes orthogonal to each other in the positioning apparatus; a triaxial acceleration sensor which detects triaxial accelerations which are accelerations of the three axes orthogonal to each other in the positioning apparatus; a distance measuring unit which calculates a moving distance, a speed, and a longitudinal acceleration of the moving body based on the pulse signal output from the speed sensor per certain cycle; a triaxial acceleration sensor zero point calculating unit which determines whether or not the moving body is performing horizontal plane uniform linear traveling for linearly traveling at a uniform speed on a horizontal plane, based on at least the triaxial speeds calculated by the GNSS receiver, the longitudinal acceleration calculated by the distance measuring unit and the triaxial accelerations detected by the triaxial acceleration sensor while the moving body is traveling, and calculates the triaxial accelerations detected by the triaxial acceleration sensor as a zero point when a determination is made that the moving body is performing the horizontal plane uniform linear traveling; a apparatus housing attachment angle calculating unit which calculates a pitch direction attachment angle and a roll direction attachment angle of the positioning apparatus attached to the moving body based on the zero point of the triaxial accelerations calculated by the triaxial acceleration sensor zero point calculating unit; a triaxial angular velocity coordinate transforming unit which coordinate-transforms the triaxial angular velocities detected by the triaxial angular velocity sensor based on the pitch direction attachment angle and the roll direction attachment angle calculated by the apparatus housing attachment angle calculating unit; and a position estimating unit which estimates the current position of the moving body based on at least a yaw rate obtained from the triaxial angular velocities transformed by the triaxial angular velocity coordinate transforming unit.

Further, a positioning method according to the present invention is a positioning method used by a positioning apparatus of a moving body, the method including: receiving a radio wave from a GPS satellite, calculating at least a current position of the moving body and triaxial speeds including a longitudinal direction speed, a lateral direction speed, and a vertical direction speed, which are speeds of three axes orthogonal to each other in the positioning apparatus, and outputting a calculation result as a positioning result; outputting a pulse signal corresponding to movement of the moving body; detecting triaxial angular velocities which are angular velocities of the three axes orthogonal to each other in the positioning apparatus; detecting triaxial accelerations which are accelerations of the three axes orthogonal to each other in the positioning apparatus; calculating a moving distance, a speed, and a longitudinal acceleration of the moving body based on the pulse signal output per certain cycle; determining whether or not the moving body is performing horizontal plane uniform linear traveling for linearly traveling at a uniform speed on a horizontal plane, based on at least the triaxial speeds calculated as the positioning result, the calculated longitudinal acceleration and the detected triaxial accelerations while the moving body is traveling, and calculating the triaxial accelerations as a zero point when a determination is made that the moving body is performing the horizontal plane uniform linear traveling; calculating a pitch direction attachment angle and a roll direction attachment angle of the positioning apparatus attached to the moving body based on the zero point of the calculated triaxial accelerations; coordinate-transforming the detected triaxial angular velocities based on the calculated pitch direction attachment angle and the calculated roll direction attachment angle; and estimating the current position of the moving body based on at least a yaw rate obtained from the triaxial angular velocities after the coordinate transformation.

Effects of the Invention

According to the present invention, the positioning apparatus is a positioning apparatus of a moving body, the apparatus including: a GNSS receiver which receives a radio wave from a GPS satellite, calculates at least a current position of the moving body and triaxial speeds including a longitudinal direction speed, a lateral direction speed, and a vertical direction speed, which are speeds of three axes orthogonal to each other in the positioning apparatus, and outputs a calculation result as a positioning result; a speed sensor which outputs a pulse signal corresponding to movement of the moving body; a triaxial angular velocity sensor which detects triaxial angular velocities which are angular velocities of the three axes orthogonal to each other in the positioning apparatus; a triaxial acceleration sensor which detects triaxial accelerations which are accelerations of the three axes orthogonal to each other in the positioning apparatus; a distance measuring unit which calculates a moving distance, a speed, and a longitudinal acceleration of the moving body based on the pulse signal output from the speed sensor per certain cycle; a triaxial acceleration sensor zero point calculating unit which determines whether or not the moving body is performing horizontal plane uniform linear traveling for linearly traveling at a uniform speed on a horizontal plane, based on at least triaxial speeds calculated by the GNSS receiver, the longitudinal acceleration calculated by the distance measuring unit and the triaxial accelerations detected by the triaxial acceleration sensor while the moving body is traveling, and calculates the triaxial accelerations detected by the triaxial acceleration sensor as a zero point when a determination is made that the moving body is performing the horizontal plane uniform linear traveling; a apparatus housing attachment angle calculating unit which calculates a pitch direction attachment angle and a roll direction attachment angle of the positioning apparatus attached to the moving body based on the zero point of the triaxial accelerations calculated by the triaxial acceleration sensor zero point calculating unit; a triaxial angular velocity coordinate transforming unit which coordinate-transforms the triaxial angular velocities detected by the triaxial angular velocity sensor based on the pitch direction attachment angle and the roll direction attachment angle calculated by the apparatus housing attachment angle calculating unit; and a position estimating unit which estimates the current position of the moving body based on at least a yaw rate calculated from the triaxial angular velocities transformed by the triaxial angular velocity coordinate transforming unit. Consequently, it is possible to estimate an subject vehicle position regardless of an attachment angle of the positioning apparatus.

Further, the positioning method is the positioning method used by the positioning apparatus of the moving body, the method including: receiving a radio wave from a GPS satellite, calculating at least a current position of the moving body and triaxial speeds including a longitudinal direction speed, a lateral direction speed, and a vertical direction speed, which are speeds of three axes orthogonal to each other in the positioning apparatus, and outputting a calculation result as a positioning result; outputting a pulse signal corresponding to movement of the moving body; detecting triaxial angular velocities which are angular velocities of the three axes orthogonal to each other in the positioning apparatus; detecting triaxial accelerations which are accelerations of the three axes orthogonal to each other in the positioning apparatus; calculating a moving distance, a speed, and a longitudinal acceleration of the moving body based on the pulse signal output per certain cycle; determining whether or not the moving body is performing horizontal plane uniform linear traveling for linearly traveling at a uniform speed on a horizontal plane, based on at least the triaxial speeds calculated as a positioning result, the calculated longitudinal acceleration, and the detected triaxial accelerations while the moving body is traveling, and calculating the triaxial accelerations as a zero point when a determination is made that the moving body is performing the horizontal plane uniform linear traveling; calculating a pitch direction attachment angle and a roll direction attachment angle of the positioning apparatus attached to the moving body based on the zero point of the calculated triaxial accelerations; coordinate-transforming the detected triaxial angular velocities based on the calculated pitch direction attachment angle and the calculated roll direction attachment angle; and estimating the current position of the moving body based on at least a yaw rate obtained from the triaxial angular velocities after the coordinate transformation. Consequently, it is possible to estimate the subject vehicle position regardless of the attachment angle of the positioning apparatus.

The objects, features, aspects, and advantages of the present invention will become more apparent from the following detailed description and the accompanying drawings.

DESCRIPTION OF EMBODIMENTS

Figure 1:
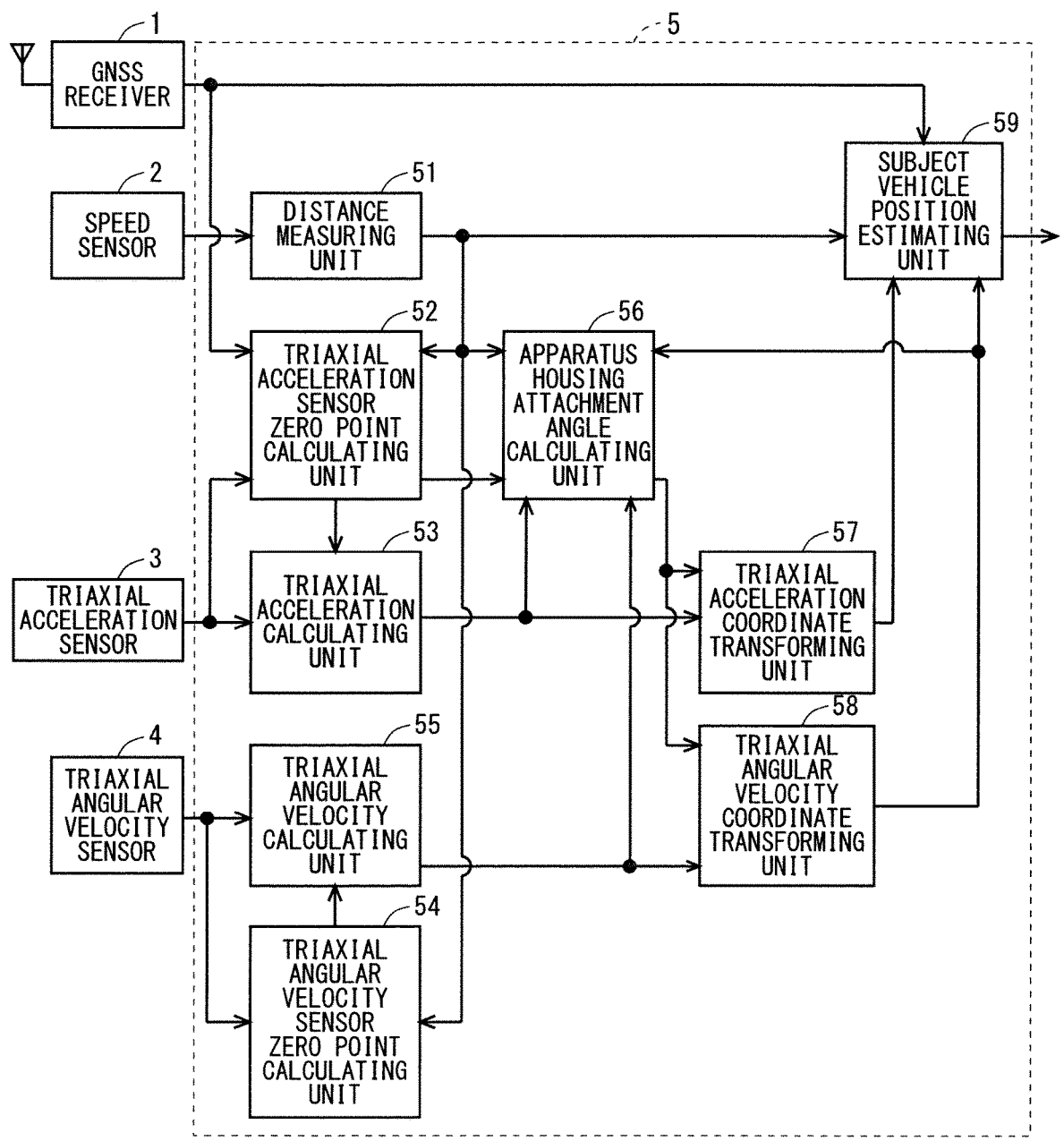
FIG. 1 is a block diagram showing an example of a configuration of a positioning apparatus according to a first embodiment of the present invention.

Embodiments of the present invention will be described below with reference to the drawings.

The present embodiment will be described by using a vehicle body coordinate system shown in FIG. 12 and a sensor coordinate system shown in FIG. 13.

<Introduction>

Prior to describing the embodiments of the present invention, a case where an attachment angle of a positioning apparatus is inclined will be described in detail.

When an angular velocity sensor and an acceleration sensor whose detection axes are inclined in a pitch direction or a yaw direction are used in the positioning apparatus, it is necessary to consider each characteristic of the following angular velocity sensor and acceleration sensor.

(1) The angular velocity sensor (or the acceleration sensor) measures an angular velocity (or acceleration) acting on the detection axis. When the detection axis is inclined, sensitivity of the angular velocity (or acceleration) acting on the detection axis decreases according to an inclination angle, and conversely the sensitivity of the other axis existing in the inclination direction increases. That is, an angular velocity (or an acceleration) distributed to each axis is detected according to the attachment angle of the angular velocity sensor (or the acceleration sensor).

(2) When an angular velocity sensor of the three axes (hereinafter referred to as a triaxial angular velocity sensor) or an acceleration sensor of three axes (hereinafter referred to as a triaxial acceleration sensor) are used, by using an Euler angle or a quaternion, it is possible to transform to a sensor output when the triaxial angular velocity sensor or the triaxial acceleration sensor is rotated by an arbitrary attachment angle. However, when a biaxial or uniaxial angular velocity sensor or acceleration sensor is used, it is not possible to measure an angular velocity or an acceleration to be measured on the detection axis which is not equipped. Therefore, it is only conditionally possible to transform (restore) to a sensor output at an arbitrary attachment angle.

(3) Regarding the angular velocity sensor, no angular velocity is generated during stop, so that it is possible to obtain a zero point based on the sensor output during stop.

(4) When the acceleration sensor inclines, the acceleration sensor is influenced by the gravity according to the inclination angle, so that the inclination angle of the acceleration sensor can be estimated based on the sensor output during stop. However, it is not possible to distinguish whether the inclination of the acceleration sensor is due to an inclination of a road, an attachment angle of the housing of the positioning apparatus, or a temperature drift caused by a variation of the sensor output. Therefore, it is not possible to accurately determine the zero point based on the sensor output during stop.

In order to express the position and attitude angle of the vehicle, it is necessary to determine an orthogonal triaxial coordinate system. A plurality of definitions of the X axis, the Y axis, and the Z axis in the orthogonal triaxial coordinate system is proposed. As shown in FIG. 12, the present invention defines a longitudinal direction of the vehicle as an $X_B$ axis, a lateral direction (normal direction) orthogonal to the longitudinal direction of the vehicle as a $Y_B$ axis, and a coordinate system in which a direction orthogonal to a vertical direction with respect to the X-Y plane of the vehicle is a $Z_B$ axis direction as a vehicle body coordinate system. The subscript "B" on each axis means "Body Frame". $A_B x$, $A_B y$, and $A_B z$ represent accelerations in respective axial directions, and $\omega_{Broll}$, $\omega_{Bpitch}$, and $\omega_{Byaw}$ represent angular velocities in the respective axial directions.

Figure 13:
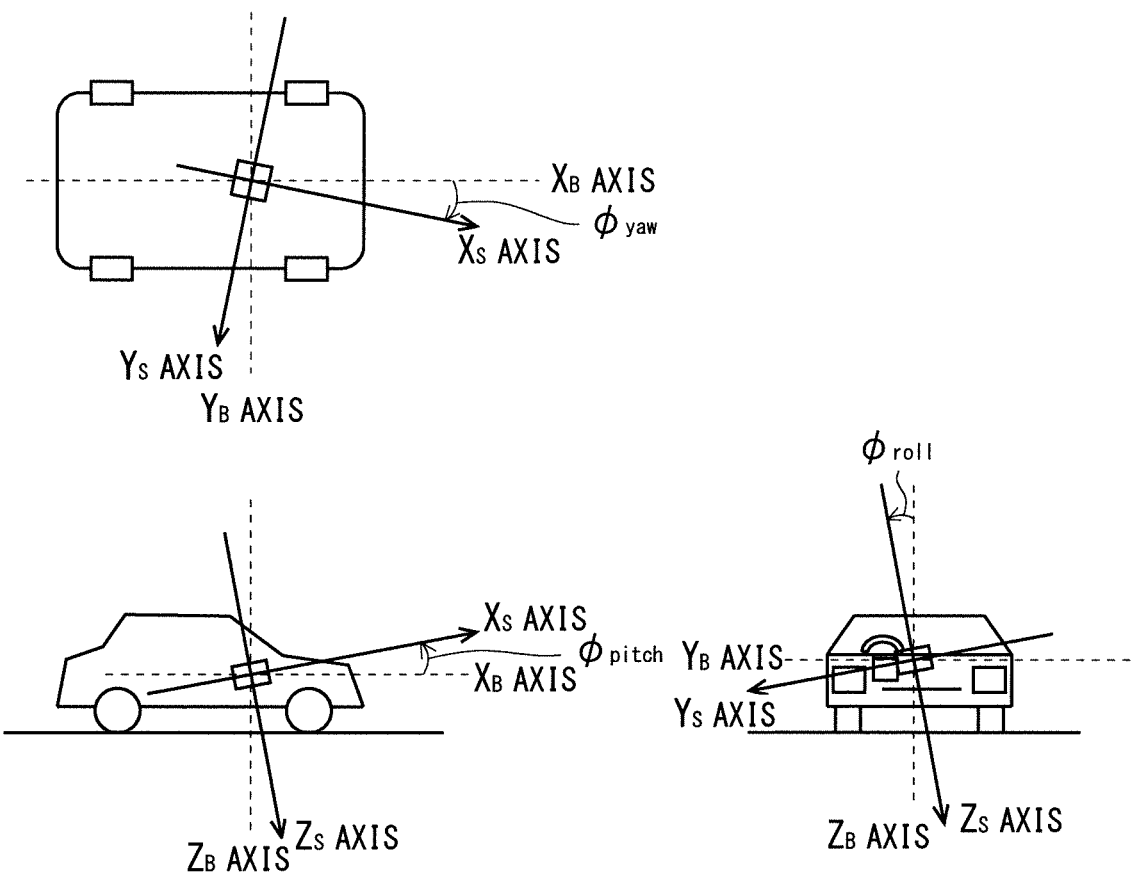
FIG. 13 is a view for explaining a definition of the sensor coordinate system.

FIG. 13 shows that the housing of the positioning apparatus is installed on the vehicle body while inclining at a predetermined attachment angle. In this case, each of the sensor detection axes (an $X_S$ axis, a $Y_S$ axis, and a $Z_S$ axis) inclines at a roll direction attachment angle $\phi_{roll}$ which is an attachment angle in a roll direction, a pitch direction attachment angle $\phi_{pitch}$ which is an attachment angle in a pitch direction, and yaw direction attachment angle $\phi_{yaw}$ which is an attachment angle in a yaw direction with respect to an $X_B$ axis, a $Y_B$ axis, and a $Z_B$ axis of the vehicle body coordinate system. In the present invention, the coordinate system of the sensor detection axes (the $X_S$ axis, the $Y_S$ axis, and the $Z_S$ axis) is defined as a sensor coordinate system and distinguished from the vehicle body coordinate system.

When the roll direction attachment angle, the pitch direction attachment angle, and the roll direction attachment angle are known, it is possible to obtain an Euler coordinate transformation matrix $C_B^S$ for coordinate-transforming the vehicle body coordinate system into the sensor coordinate system by Formula (1). By applying the coordinate transformation matrix $C_B^S$ obtained by Formula (1) to Formula (2), it is possible to coordinate-transform a measurement amount $M_B$ of the vehicle body coordinate system into a measurement amount $M_S$ of the sensor coordinate system. Here, the measurement amount is an attitude angle or an acceleration according to a calculation purpose.

[Mathematical Formula 1]

$$C_B^S = \begin{pmatrix} \cos\phi y \cdot \cos\phi p & \sin\phi y \cdot \cos\phi p & -\sin\phi p \\ \cos\phi y \cdot \sin\phi p \cdot \sin\phi r - \sin\phi y \cdot \cos\phi r & \sin\phi y \cdot \sin\phi p \cdot \sin\phi r + \cos\phi y \cdot \cos\phi r & \cos\phi p \cdot \sin\phi r \\ \cos\phi y \cdot \sin\phi p \cdot \cos\phi r + \sin\phi y \cdot \sin\phi r & \sin\phi y \cdot \sin\phi p \cdot \cos\phi r - \cos\phi y \cdot \sin\phi r & \cos\phi p \cdot \cos\phi r \end{pmatrix} \quad (1)$$

[Mathematical Formula 2]

$$M_S = C_B^S \cdot M_B \quad (2)$$

Similarly, when the roll direction attachment angle, the pitch direction attachment angle, and the roll direction attachment angle are known, it is possible to obtain an Euler coordinate transformation matrix $C_S^B$ for coordinate-transforming the sensor coordinate system into the vehicle body coordinate system by Formula (3). By applying the coordinate transformation matrix $C_S^B$ obtained by Formula (3) to Formula (4), it is possible to coordinate-transform a measurement amount $M_S$ of the sensor coordinate system into the measurement amount $M_B$ of the vehicle body coordinate system.

[Mathematical Formula 3]

$$C_S^B = \begin{pmatrix} \cos\phi y \cdot \cos\phi p & \cos\phi y \cdot \sin\phi p \cdot \sin\phi r - \sin\phi y \cdot \cos\phi r & \cos\phi y \cdot \sin\phi p \cdot \cos\phi r + \sin\phi y \cdot \sin\phi r \\ \sin\phi y \cdot \cos\phi p & \sin\phi y \cdot \sin\phi p \cdot \sin\phi r + \cos\phi y \cdot \cos\phi r & \sin\phi y \cdot \sin\phi p \cdot \cos\phi r - \cos\phi y \cdot \sin\phi r \\ -\sin\phi p & \cos\phi p \cdot \sin\phi r & \cos\phi p \cdot \cos\phi r \end{pmatrix} \quad (3)$$

[Mathematical Formula 4]

$$M_B = C_B^S \cdot M_S \quad (4)$$

Instead of the above Euler's coordinate transformation, a coordinate transformation matrix which uses quaternions expressed by Formulas (5) to (9) is used in some cases.

[Mathematical Formula 5]

$$q_0 = \cos(\phi y/2) \cdot \cos(\phi p/2) \cdot \cos(\phi r/2) + \sin(\phi y/2) \cdot \sin(\phi p/2) \cdot \sin(\phi r/2) \quad (5)$$

$$q_1 = \cos(\phi y/2) \cdot \cos(\phi p/2) \cdot \sin(\phi r/2) - \sin(\phi y/2) \cdot \sin(\phi p/2) \cdot \cos(\phi r/2) \quad (6)$$

$$q_2 = \cos(\phi y/2) \cdot \sin(\phi p/2) \cdot \cos(\phi r/2) + \sin(\phi y/2) \cdot \cos(\phi p/2) \cdot \sin(\phi r/2) \quad (7)$$

$$q_3 = \sin(\phi y/2) \cdot \cos(\phi p/2) \cdot \cos(\phi r/2) - \cos(\phi y/2) \cdot \sin(\phi p/2) \cdot \sin(\phi r/2) \quad (8)$$

$$C_S^B = \begin{pmatrix} q_0^2 + q_1^2 - q_2^2 - q_3^2 & 2(q_1 \cdot q_2 - q_0 \cdot q_3) & 2(q_1 \cdot q_3 + q_0 \cdot q_2) \\ 2(q_1 \cdot q_2 + q_0 \cdot q_3) & q_0^2 - q_1^2 + q_2^2 - q_3^2 & 2(q_2 \cdot q_3 - q_0 \cdot q_1) \\ 2(q_1 \cdot q_3 - q_0 \cdot q_2) & 2(q_2 \cdot q_3 + q_0 \cdot q_1) & q_0^2 - q_1^2 - q_2^2 + q_3^2 \end{pmatrix} \quad (9)$$

Conventionally, Patent Documents 1 to 3 disclose a technique of calculating an attachment angle of a positioning apparatus by using the coordinate transformation formulas of Formula (1) to Formula (4), respectively.

Figure 3:
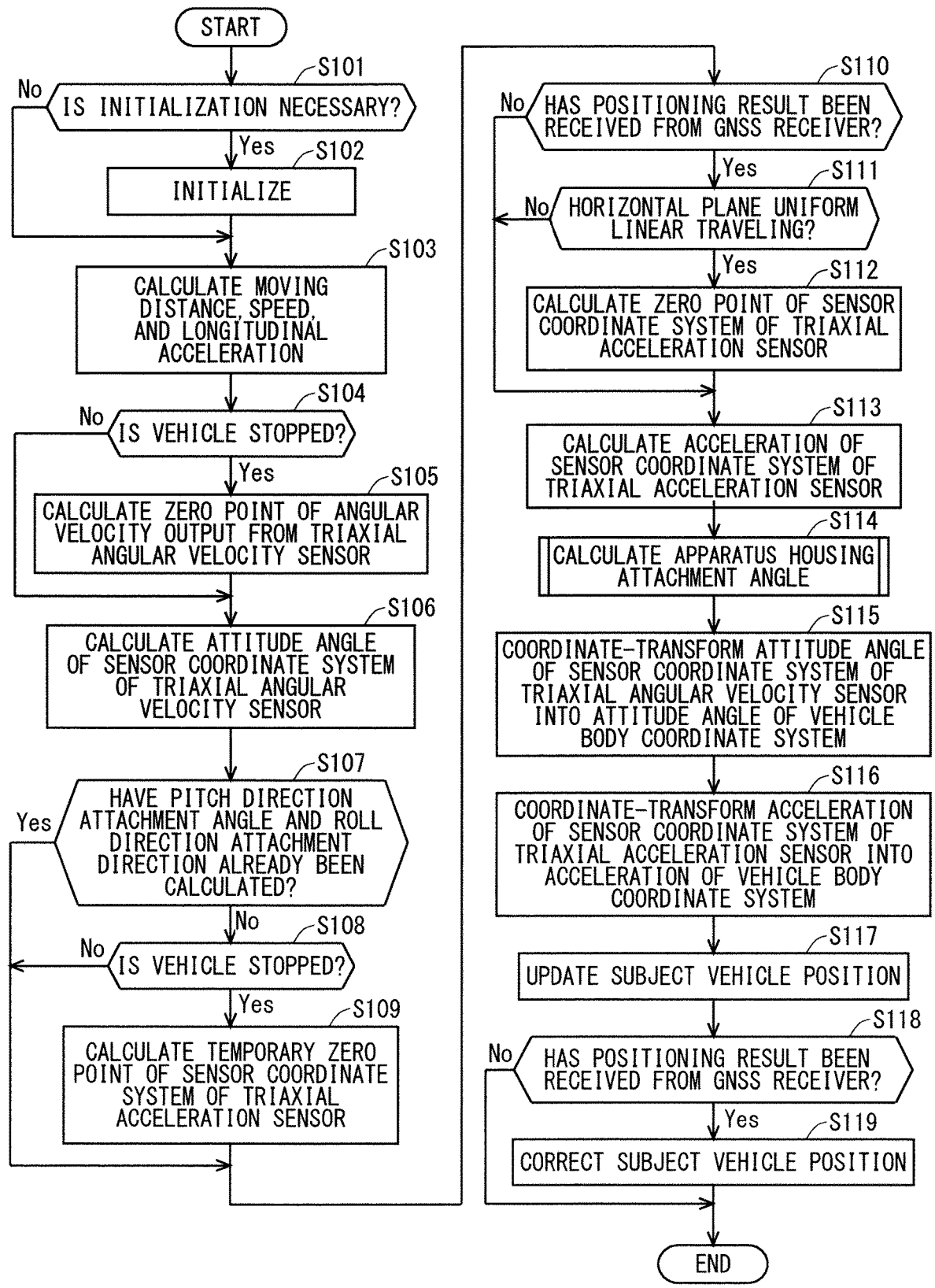
FIG. 3 is a flowchart showing an example of an operation of the positioning apparatus according to the first embodiment of the present invention.
Figure 12:
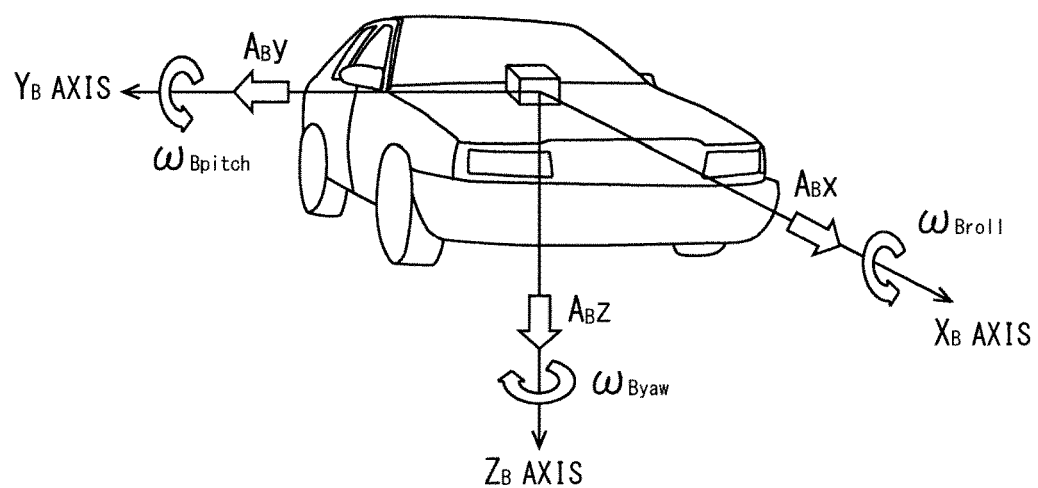
FIG. 12 is a view for explaining a definition of the vehicle body coordinate system.

In Patent Document 1, the vehicle body coordinate system is rotated by 90 degrees around the X axis of the vehicle body coordinate system shown in FIG. 12. Also, each of the longitudinal direction (a front side indicates positive polarity), the vertical direction (a lower side indicates positive polarity), and the lateral direction (a left side indicates positive polarity) correspond to the X axis, the Y axis, and the Z axis of the vehicle body coordinate system, respectively (Patent Document 1: FIG. 3). Patent Document 1 aims to estimate an subject vehicle position without connecting a vehicle speed signal of the vehicle to the positioning apparatus. The positioning apparatus is attached to the vehicle body to enable detection of longitudinal acceleration of the vehicle by using acceleration sensors of two or more axes. Hereinafter, calculation of the zero point of the output of the acceleration sensor and the attachment angle of the positioning apparatus in Patent Document 1 will be briefly described.

First, a method for calculating a zero point will be described.

Based on whether or not a waveform of an output signal of the triaxial acceleration sensor has fluctuated at a predetermined level or more, whether or the vehicle is traveling or is stopped is determined (Patent Document 1: FIG. 3). When it is determined that the vehicle is stopped, the output of each axis of the acceleration sensor is stored as the zero point of each axis. Subsequently, the zero point is subtracted from the output of each axis of the acceleration sensor to obtain the acceleration (Ax, Ay, and Az) of each axis [m/s²] (Patent Document 1: paragraphs [0020] to [0027]).

Next, a method for calculating a pitch direction attachment angle will be described.

When a zero point is detected and then the vehicle stops on a horizontal surface (A=0), the pitch direction attachment angle θsz is calculated by Formula (10) (Patent Document 1: paragraphs [0036] to [0038]).

[Mathematical Formula 6]

$$Ax = A \cdot \cos\theta sz - G \cdot \sin\theta sz$$

$$\theta sz = -\sin^{-1}(Ax/G) \quad (10)$$

Further, when the vehicle stops (A=0) on the inclined (θrz) road and when a pitch direction attachment angle θsz is 0, a road inclination angle (θrz) is calculated by Formula (11) (Patent Document 1: paragraphs [0033] to [0035]).

[Mathematical Formula 7]

$$Ax = A - G \cdot \sin\theta rz$$

$$\theta rz = -\sin^{-1}(Ax/G) \quad (11)$$

When the acceleration sensor is attached to the vehicle body at the pitch direction attachment angle θsz and the vehicle travels on an inclined (θrz) road, it is not possible to directly obtain the pitch direction attachment angle θsz. Therefore, by using the road inclination angle θrz stored in a map memory during stop (A=0), the pitch direction attachment angle θsz is calculated by Formula (12) (Patent Document 1: paragraphs [0041] to [0045] and [0088]).

[Mathematical Formula 8]

$$Ax = A \cdot \cos\theta sz - G \cdot \sin(\theta rz + \theta sz)$$

$$\theta sz = -\sin^{-1}(Ax/G) - \theta rz \quad (12)$$

Next, a method for calculating a roll direction attachment angle will be described.

Similar to the pitch direction attachment angle $\theta sz$, the road inclination angle $\theta rx$ stored in the map memory is used to calculate the roll direction attachment angle $\theta sx$ by Formula (13) during stop.

[Mathematical Formula 9]

$$Az = A \cdot \cos \theta sx - G \cdot \sin(\theta rx + \theta sx)$$

$$\theta sx = -\sin^{-1}(Az/G) - \theta rx \qquad (13)$$

Next, a method for calculating a yaw direction attachment angle will be described.

A longitudinal acceleration A and a yaw direction attachment angle $\theta sy$ are simultaneously calculated by solving the simultaneous equations of Formulas (14) and (15) during linear traveling.

[Mathematical Formula 10]

$$Ax = A \cdot \cos \theta sy \qquad (14)$$

$$Az = -A \cdot \sin \theta sy \qquad (15)$$

In addition, based on the relationship between a speed Vx obtained by integrating the output Ax of the acceleration sensor during linear traveling and a GPS speed $V_{GPS}$, the yaw direction attachment angle $\theta y$ is calculated by Formulas (16) and (17) (Patent Document 1: paragraphs [0051] to [0057]).

[Mathematical Formula 11]

$$Vx = V_{GPS} \cdot \cos \theta sy \qquad (16)$$

$$\theta sy = -\cos^{-1}(Vx/V_{GPS}) \qquad (17)$$

Figure 2:
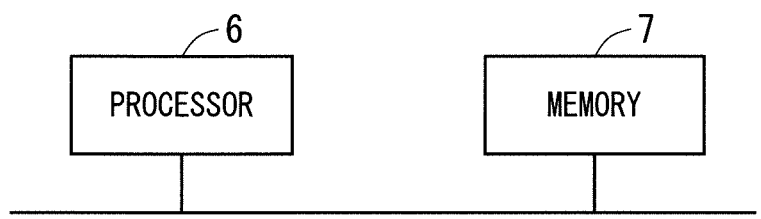
FIG. 2 is a block diagram showing an example of a hardware configuration of a positioning apparatus according to the first embodiment of the present invention.

Further, in Patent Document 2, the vehicle body coordinate system is the same as the vehicle body coordinate system shown in FIG. 12 (Patent Document 2: FIG. 2). Patent Document 2 includes a first autonomous positioning calculating unit including an odometer (wheel rotation speed) and a biaxial angular velocity sensor (a yaw rate and a pitch rate), and a second autonomous positioning calculating unit including a triaxial acceleration sensor (Patent Document 2: FIG. 1). From the difference between autonomous positioning results of each of the first autonomous positioning calculating unit and the second autonomous positioning calculating unit, a scale factor error of the odometer and an attachment angle error of the positioning apparatus are obtained. The first autonomous positioning calculating unit and the second autonomous positioning calculating unit correct these errors. Hereinafter, a method for calculating an attachment angle error in Patent Document 2 will be briefly described.

The first autonomous positioning calculating unit calculates a speed $V_1$ and a moving distance $L_1$ from the odometer (wheel rotation speed n) by Formula (18), integrates the biaxial angular velocity (a yaw rate $\omega y$, and a pitch rate $\theta p$) and calculates an azimuth angle $\theta y$ and a pitch angle $\theta p$.

[Mathematical Formula 12]

$$V_1 = n(\text{rpm}) \cdot SF \cdot L_1 = \int V_1 dt \qquad (18)$$

In addition, the first autonomous positioning calculating unit calculates various moving distances by Formulas (19) to (22) by using the speed $V_1$, the azimuth angle $\theta y$, and the pitch angle $\theta p$.

[Mathematical Formula 13]

$$V_{H1} = V_1 \cdot \cos \theta p \cdot L_{H1} = \int V_{H1} dt \qquad (19)$$

$$V_{V1} = V_1 \cdot \sin \theta p \cdot L_{V1} = \int V_{V1} dt \qquad (20)$$

$$V_{HE1} = V_{H1} \cdot \sin \theta y \cdot L_{HE1} = \int V_{HE1} dt \qquad (21)$$

$$V_{HN1} = V_{H1} \cdot \cos \theta y \cdot L_{HN1} = \int V_{HN1} dt \qquad (22)$$

The second autonomous positioning calculating unit calculates a speed $V_2$ and a moving distance $L_2$ from the accelerations ($A_Sx$, $A_Sy$, and $A_Sz$) measured by the triaxial acceleration sensor by Formula (23).

[Mathematical Formula 14]

$$V_2 = \int \sqrt{(A_sx^2 + A_sy^2 + A_sz^2)} dt \cdot L_2 \int V_2 dt \qquad (23)$$

In addition, the second autonomous positioning calculating unit calculates various moving distances by Formulas (24) to (28) by using a speed $V_2$, an azimuth angle $\theta y$, and a pitch angle $\theta p$.

[Mathematical Formula 15]

$$A_H x = A_s x \cdot \cos \theta p + A_s z \cdot \sin \theta p \qquad (24)$$

$$V_{H2} = \int \sqrt{(A_H x^2 + A_s y^2)} dt \cdot L_{H2} = \int V_{H2} dt \qquad (25)$$

$$V_{V2} = \int (A_s x \cdot \sin \theta p - A_s z \cdot \cos \theta p) dt \cdot L_{V2} = \int V_{V2} dt \qquad (26)$$

$$V_{HE2} = \int (A_H x \cdot \sin \theta y + A_s y \cdot \cos \theta y) dt \cdot L_{HE2} = \int V_{HE2} dt \qquad (27)$$

$$V_{HN2} = \int (A_H x \cdot \cos \theta y - A_s y \cdot \sin \theta y) dt \cdot L_{HN2} = \int V_{HN2} dt \qquad (28)$$

The first autonomous positioning calculating unit and the second autonomous positioning calculating unit calculate a scale factor error $\delta SF$, a pitch direction attachment angle error $\delta \theta p$, and a yaw direction attachment angle error $\delta \theta y$ by Formulas (29) to (31) based on the various moving distances. The first autonomous positioning calculating unit and the second autonomous positioning calculating unit correct the scale factor SF, the pitch direction attachment angle $\theta p$, and the yaw direction attachment angle $\theta y$ by Formulas (32) to (34).

[Mathematical Formula 16]

$$\delta SF = (L_1 - L_2)L_1 \qquad (29)$$

$$\delta \theta p = \tan^{-1}(L_{V1}/L_{H1}) - \tan^{-1}(L_{V1}/L_{H1}) \qquad (30)$$

$$\delta \theta y = \tan^{-1}(L_{HE1}/L_{HN1}) - \tan^{-1}(L_{HE2}/L_{HN2}) \qquad (31)$$

[Mathematical Formula 17]

$$SF = SF(1 - \delta SF) \qquad (32)$$

$$\theta p = \theta p - \delta \theta p \qquad (33)$$

$$\theta y = \theta y - \delta \theta y \qquad (34)$$

In Patent Document 3, the vehicle body coordinate system differs only in the polarity of the Z axis from the vehicle body coordinate system shown in FIG. 12. Also, the longitudinal direction (the front side indicates positive polarity), the lateral direction (a right side indicates positive polarity), and the vertical direction (an upper side indicates positive polarity) correspond to the X axis, the Y axis, and the Z axis, respectively (Patent Document 3: FIG. 2). Similar to Patent Document 1, Patent Document 3 aims to estimate an subject vehicle position without connecting a vehicle speed signal of the vehicle to the positioning apparatus. Patent Document 3 assumes that removal and installation of the apparatus are repeated frequently and the attachment angle is different every time. Patent Document 3 includes a uniaxial angular velocity sensor, a triaxial acceleration sensor, and a GPS receiver. Hereinafter, calculation of the zero point of the output of the acceleration sensor and the attachment angle of the apparatus in Patent Document 3 will be briefly described.

First, a method for calculating a zero point will be described.

When the output of the triaxial acceleration sensor in a certain time (e.g., three seconds) falls within an arbitrary variation range, it is determined that the vehicle is stopped. When the output does not fall within the arbitrary variation range, it is determined that the vehicle is traveling. When it is determined that the vehicle is stopped, the average value of the outputs of each axis of the acceleration sensor is obtained. Until the average value is obtained again when the vehicle stops at a different point, this average value is held as the zero point ($A_S x_{bias}$, $A_S y_{bias}$, and $A_S z_{bias}$). In addition, the zero point error changes according to a temperature and a road inclination (Patent Document 3: paragraphs [0048] to [0058]).

Next, a method for calculating a pitch direction attachment angle will be described.

The acceleration sensor is influenced by the fluctuation of zero point due to a temperature drift and gravity, and therefore the pitch direction attachment angle is calculated only within 10 m from departure of the vehicle. In the case where the yaw direction attachment angle and the roll direction attachment angle are small, the pitch direction attachment angle θp is simply calculated by Formulas (35) to (37) (Patent Document 3: paragraphs [0061] to [0065]). Note that A represents a longitudinal acceleration of the vehicle.

[Mathematical Formula 18]

$$\Delta Ax = A_s x - A_s x_{bias} = A_B x \cdot \sin \theta p \quad (35)$$

$$\Delta Az = A_s z - A_s z_{bias} = A_B x \cdot \cos \theta p \quad (36)$$

$$\theta p = \tan^{-1}(\Delta Ax / \Delta Az) \quad (37)$$

Next, a method for calculating a yaw direction attachment angle will be described.

At the same timing as the calculation of the pitch direction attachment angle, the yaw direction attachment angle is calculated. When the pitch direction attachment angle and the roll direction attachment angle are small, the yaw direction attachment angle θy is simply calculated by Formulas (38) to (40) (Patent Document 3: paragraph [0065]).

[Mathematical Formula 19]

$$\Delta Ax = A_s x - A_s x_{bias} = A_B x \cdot \cos \theta y \quad (38)$$

$$\Delta Ay = A_s z - A_s z_{bias} = -A_B x \cdot \sin \theta y \quad (39)$$

$$\theta y = \tan^{-1}(-\Delta Ay / \Delta Ax) \quad (40)$$

Next, a method for calculating a roll direction attachment angle will be described.

A centrifugal force is calculated based on the GPS speed and the yaw rate by the single axis angular velocity sensor. When the centrifugal force is equal to or greater than a certain value, the roll direction attachment angle is calculated. When the yaw direction attachment angle and the pitch direction attachment angle are small, the roll direction attachment angle θr is simply calculated by Formulas (41) to (43) (Patent Document 3: paragraphs [0066] to [0074]).

[Mathematical Formula 20]

$$\Delta Ay = A_s z - A_s z \text{ zero point} = A_B y \cdot \cos \theta r \quad (41)$$

$$\Delta Az = A_s z - A_s z \text{ zero point} = -A_B y \cdot \sin \theta r \quad (42)$$

$$\theta r = \tan^{-1}(\Delta Az / \Delta Ay) \quad (43)$$

Next, correction of an attachment angle will be described.

When two or more attachment angles are equal to or greater than a threshold (for example, five degrees), the attachment angle is corrected by a combination of attachment angles equal to or greater than the threshold value. When, for example, the roll direction attachment angle is 0 and the yaw direction attachment angle and the pitch direction attachment angle are equal to or greater than the threshold value, the yaw direction attachment angle is corrected by Formulas (44) to (47) during linear traveling (Patent Document 3: paragraphs [0066] to [0081]).

[Mathematical Formula 21]

$$\Delta Ax = A_B x (\cos \theta y \cdot \cos \theta p) \quad (44)$$

$$\Delta Ay = A_B x (\cos \theta y \cdot \sin \theta p \cdot \sin \theta r - \sin \theta y \cdot \cos \theta r) \quad (45)$$

$$\Delta Az = A_B x (\cos \theta y \cdot \sin \theta p \cdot \cos \theta r + \sin \theta y \cdot \sin \theta r) \quad (46)$$

$$\theta y = -\tan^{-1}(\Delta Ay / \Delta Ax \cdot \cos \theta p) \quad (47)$$

<Problem 1>

Figure 14:
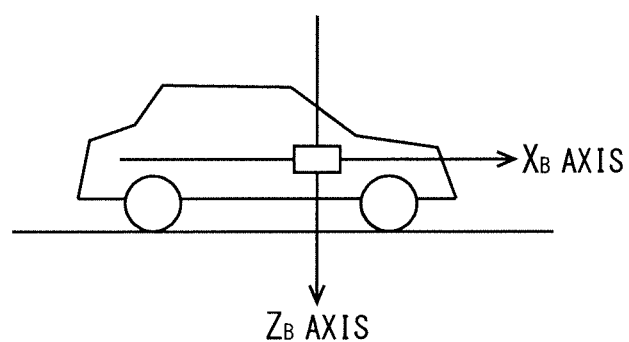
FIG. 14 is a view for explaining a problem of calculation of a pitch direction attachment angle.
Figure 15:
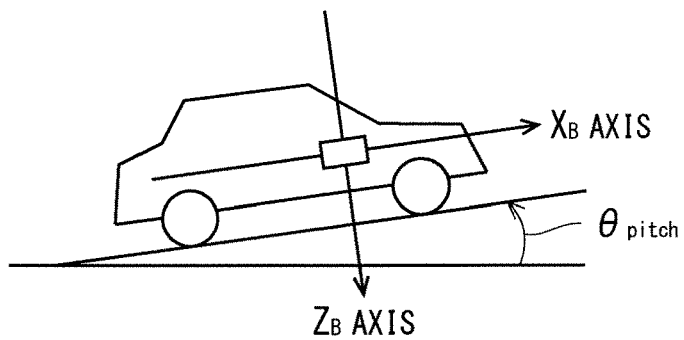
FIG. 15 is a view for explaining a problem of calculation of the pitch direction attachment angle.
Figure 16:
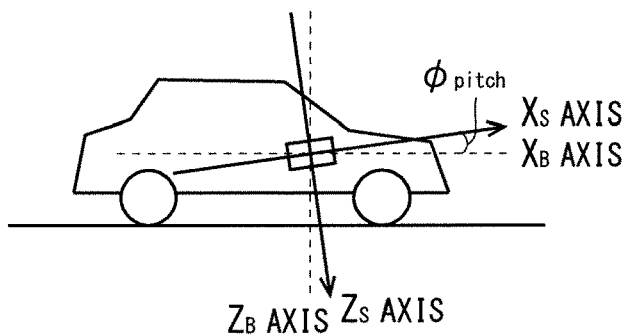
FIG. 16 is a view for explaining a problem of calculation of the pitch direction attachment angle.
Figure 17:
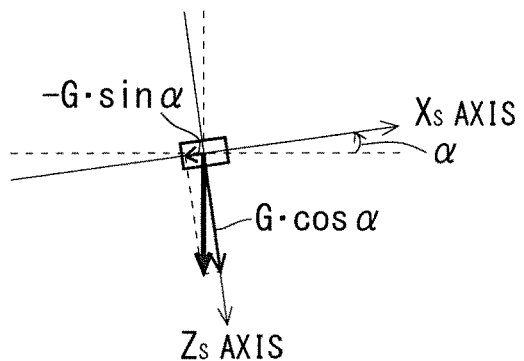
FIG. 17 is a view for explaining a problem of calculation of the pitch direction attachment angle.
Figure 18:
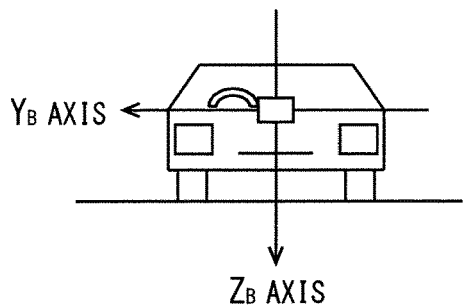
FIG. 18 is a view for explaining a problem of calculation of a roll direction attachment angle.
Figure 19:
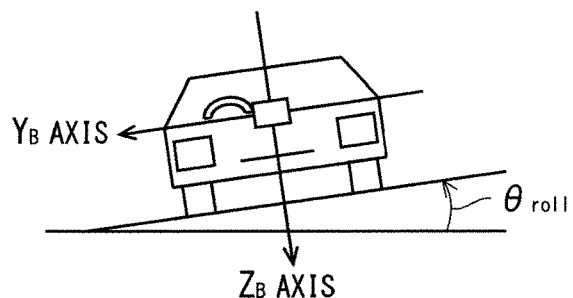
FIG. 19 is a view for explaining a problem of calculation of the roll direction attachment angle.
Figure 20:
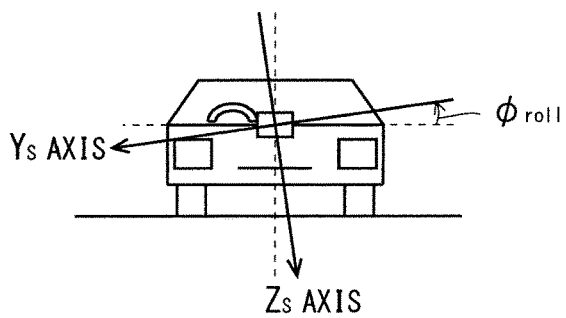
FIG. 20 is a view for explaining a problem of calculation of the roll direction attachment angle.
Figure 21:
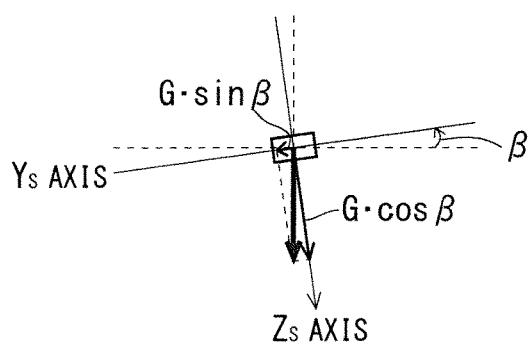
FIG. 21 is a view for explaining a problem of calculation of the roll direction attachment angle.

Conventionally, the acceleration sensor detects the influence of gravity. Consequently, it is possible to estimate the angle at which the acceleration sensor is inclined in the pitch direction, based on the output of each axis of the acceleration sensor during stop. However, it has been difficult to distinguish and determine whether a reason why the acceleration sensor is inclined is due to the inclination of the road, the attachment angle of the apparatus, or the fluctuation of the sensor output due to a temperature drift. In other words, when it is known that the vehicle exists on the horizontal plane, in any case shown in FIGS. 14 and 16, it is possible to obtain the zero point from the output of the acceleration sensor during stop and horizontal plane uniform traveling, and obtain the pitch direction attachment angle from the zero point (see, for example, FIG. 17). However, when it is not known that the vehicle exists on the horizontal plane, the vehicle may exist on the inclined plane as shown in FIG. 15. Thus, it is not possible to obtain the zero point from the output of the acceleration sensor. Therefore, it has been conventionally a problem to determine whether or not the vehicle exists on the horizontal plane. Also, as shown in FIGS. 18 to 21, the roll direction also has the problem similar to the pitch direction.

In response to the above problem, the calculation of the zero point of the acceleration sensors in Patent Document 1 and Patent Document 3 has the following problem. That is, the zero point is obtained from the output of the acceleration sensor during stop without adding particularly effective conditions, and therefore the above problem cannot be necessarily solved. In addition, although the temperature drift fluctuates the zero point during traveling, the temperature drift is not necessarily supported.

In addition to the above problem, the calculation of the attachment angle in the pitch direction and the roll direction in Patent Document 1 has the following problems.

(1) During stop after calculation of the zero point, the attachment angle is obtained from the output of the acceleration sensor when the vehicle is stopped on the horizontal surface. However, a method for distinguishing and calculating the fluctuation of the zero point and the attachment angle when the temperature drift fluctuates the zero point is not disclosed.

(2) A method for correctly determining whether or not the vehicle exists on a horizontal plane is not disclosed, and therefore calculation accuracy of the attachment angle is not necessarily high.

(3) The attachment angle is calculated by using the road inclination angle or the road bank angle included in the map data. However, when map matching is not be performed correctly, or roads are outside the road or has road data which does not include a road inclination angle and a road bank angle, the attachment angle cannot be calculated.

(4) The road inclination angle and the road bank angle are the average angles of a data section and are slightly different from the angle of a stop point, and therefore detection accuracy of the attachment angle is not necessarily high.

In addition to the above problem, the calculation of the attachment angle in the pitch direction and the roll direction in Patent Document 2 has the following problems.

(1) A pitch direction attachment angle is obtained based on the difference between the respective positioning results (various moving distances) in the first autonomous positioning calculating unit including the odometer and the biaxial angular velocity sensor, and the second autonomous positioning calculating unit including the triaxial acceleration sensor. However, using the moving distance obtained by integrating the acceleration twice as a reference increases the possibility that the attachment angle is erroneously detected due to an integral error.

(2) An effective mechanism which corrects the temperature drift upon use of the angular velocity sensor and the acceleration sensor is not disclosed. Thus, there is a possibility that the calculation accuracy of the attachment angle deteriorates as time passes.

(3) Using a high accuracy acceleration sensor with a small integral error, an angular velocity sensor with a small temperature drift, or an acceleration sensor increases cost. Further, it is not possible to calculate the roll direction attachment angle.

In addition to the above problem, the calculation of the attachment angle in the pitch direction and the roll direction in Patent Document 3 has the following problems.

(1) It is disclosed that a pitch direction attachment angle is calculated until the vehicle travels a certain distance after departure, and a roll direction attachment angle is calculated during turning which produces the centrifugal force equal to or greater than a predetermined threshold. However, under such calculation conditions, the attachment angle cannot be calculated correctly while the vehicle travels without clearly turning right or left.

(2) The calculation formula used to calculate the attachment angle is simple, and therefore the calculation accuracy is not necessarily high. Also, a measure in the case of attachment where attachment angles are greatly inclined in both the pitch direction and the roll direction is not disclosed.

<Problem 2>

Figure 22:
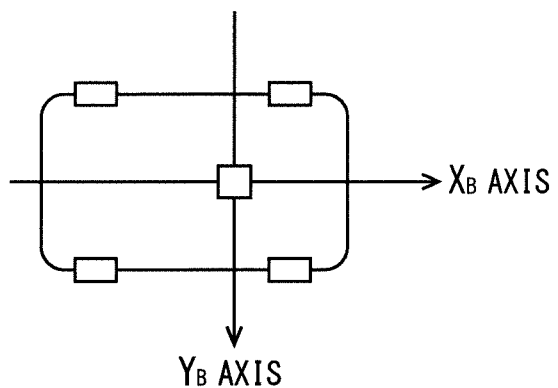
FIG. 22 is a view for explaining the problem of calculation of a yaw direction attachment angle.
Figure 23:
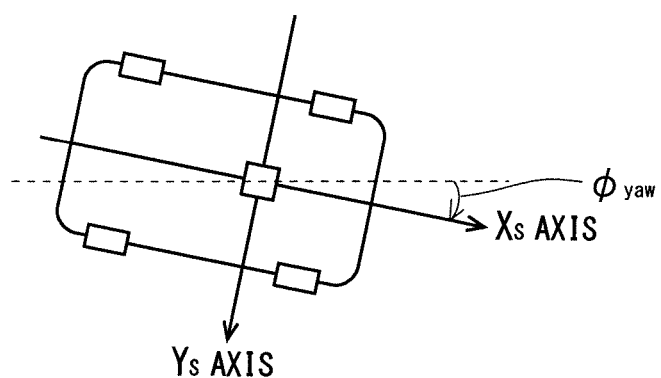
FIG. 23 is a view for explaining a problem of calculation of the yaw direction attachment angle.

During traveling on the horizontal plane after calculation of the attachment angle in the pitch direction and the roll direction, and even in one of states in FIGS. 22 and 23, it is possible to measure a yaw rate. Therefore, it is not possible to calculate the yaw direction attachment angle from the yaw rate.

In response to this problem, the calculation of the yaw direction attachment angle in Patent Documents 1, 2, and 3 has the following problems.

(1) As described in Problem 1, the calculation accuracy of the zero point of the acceleration sensor and the attachment angle in the pitch direction and the roll direction is not necessarily sufficient. Further, it is not possible to correctly determine traveling on the horizontal plane. Therefore, calculation of the yaw direction attachment angle in a state including such an error also causes an error in the yaw direction attachment angle.

(2) Patent Document 1 also discloses a method using a GPS speed, yet does not disclose a countermeasure in the case where the accuracy of the GPS speed decreases. Therefore, Patent Document 1 has a problem that, in conjunction with the error of the GPS speed, an error occurs in the yaw direction attachment angle.

(3) Patent Document 2 has the same problem as the problem described in Problem 1.

(4) Patent Documents 1, 2, and 3 disclose calculating the yaw direction attachment angle from the output of the acceleration sensor, yet do not verify the calculation result based on the output of another sensor. Therefore, Patent Documents 1, 2, and 3 have a problem that it is not possible to suppress deterioration of calculation accuracy or erroneous calculation.

First Embodiment

First, a configuration of a positioning apparatus according to the first embodiment of the present invention will be described. In this regard, the positioning apparatus is installed in a vehicle that is a moving body (hereinafter also referred to as an subject vehicle).

FIG. 1 is a block diagram showing an example of the configuration of the positioning apparatus.

As shown in FIG. 1, the positioning apparatus includes a GNSS receiver 1, a speed sensor 2, a triaxial acceleration sensor 3, a triaxial angular velocity sensor 4, and a controller 5.

The GNSS receiver 1 receives radio waves from Global Positioning System (GPS) satellites, and measures an subject vehicle position (current position) of the vehicle in which the GNSS receiver 1 is installed. The GNSS receiver 1 outputs a positioning result such as position, an azimuth direction, and triaxial speeds (a longitudinal direction speed, a lateral direction speed, and a vertical direction speed), and outputs Raw data of each GPS satellite used for positioning calculation (a satellite trajectory (Ephemeris), a pseudo distance obtained by converting a radio wave propagation time between the GPS satellite and the subject vehicle, and a Doppler shift frequency of a satellite radio wave).

The speed sensor 2 outputs a pulse signal corresponding to a moving distance of the vehicle. The triaxial acceleration sensor 3 outputs the triaxial accelerations (an X axis acceleration, a Y axis acceleration, and a Z axis acceleration) which are accelerations of three axes in the sensor coordinate system per predetermined cycle. The triaxial angular velocity sensor 4 outputs triaxial angular velocities (a roll rate, a pitch rate, and a yaw rate) which are angular velocities of the three axes in a sensor coordinate system per predetermined cycle.

The controller 5 includes a distance measuring unit 51, a triaxial acceleration sensor zero point calculating unit 52, a triaxial acceleration calculating unit 53, a triaxial angular velocity sensor zero point calculating unit 54, a triaxial angular velocity calculating unit 55, an apparatus housing attachment angle calculating unit 56, a triaxial acceleration coordinate transforming unit 57, a triaxial angular velocity coordinate transforming unit 58, and an subject vehicle position estimating unit 59.

Based on outputs of the GNSS receiver 1, the speed sensor 2, the triaxial acceleration sensor 3, and the triaxial angular velocity sensor 4, the controller 5 calculates a position, an azimuth direction, and a speed of the subject vehicle (hereinafter also referred to as subject vehicle position information). Even when the positioning apparatus is inclined in the vehicle body coordinate system and is installed in the vehicle body, the controller 5 calculates the attachment angles of the three axes (a roll direction attachment angle around the X axis, a pitch direction attachment angle around a Y axis, and a yaw direction attachment angle around a Z axis), and transforms the angular velocity and the acceleration of the sensor coordinate system into the angular velocity and the acceleration of the vehicle body coordinate system based on the calculated attachment angle to be used for calculation of the subject vehicle position information. The GNSS receiver 1 calculates the subject vehicle position information based on the Raw data obtained by receiving the satellite radio wave at the GNSS antenna. This calculated subject vehicle position information is also referred to as a GPS positioning result in particular.

The distance measuring unit 51 calculates a momentary moving distance, speed, and longitudinal acceleration of the vehicle based on the pulse signal measured by the speed sensor 2 per predetermined cycle.

The triaxial acceleration sensor zero point calculating unit 52 calculates as a zero point the output of each axis of the triaxial acceleration sensor 3 when the vehicle is linearly traveling at a uniform speed on a horizontal plane (horizontal plane uniform linear traveling) in the sensor coordinate system. The triaxial acceleration calculating unit 53 subtracts the zero point calculated by the triaxial acceleration sensor zero point calculating unit 52 from the output of the triaxial acceleration sensor 3.

The triaxial angular velocity sensor zero point calculating unit 54 calculates as the zero point the output of each axis of the triaxial angular velocity sensor 4 when the angular velocity is not generated during stop in the sensor coordinate system. The triaxial angular velocity calculating unit 55 subtracts the zero point calculated by the triaxial angular velocity sensor zero point calculating unit 54 from the output of the triaxial angular velocity sensor 4.

The apparatus housing attachment angle calculating unit 56 calculates the attachment angles of the three axes (the roll direction attachment angle, the pitch direction attachment angle, and the yaw direction attachment angle). The triaxial acceleration coordinate transforming unit 57 coordinate-transforms the output of the triaxial acceleration calculating unit 53 into the vehicle body coordinate system based on the attachment angles of the three axes calculated by the apparatus housing attachment angle calculating unit 56. The triaxial angular velocity coordinate transforming unit 58 coordinate-transforms the output of the triaxial angular velocity calculating unit 55 into the vehicle body coordinate system based on the attachment angles of the three axes calculated by the apparatus housing attachment angle calculating unit 56. The subject vehicle position estimating unit 59 estimates the position, the azimuth direction, the attitude angle, and the speed of the subject vehicle per predetermined time.

FIG. 2 is a block diagram showing an example of a hardware configuration of the positioning apparatus.

Each function of the distance measuring unit 51, the triaxial acceleration sensor zero point calculating unit 52, the triaxial acceleration calculating unit 53, the triaxial angular velocity sensor zero point calculating unit 54, the triaxial angular velocity calculating unit 55, the apparatus housing attachment angle calculating unit 56, the triaxial acceleration coordinate transforming unit 57, the triaxial angular velocity coordinate transforming unit 58, and the subject vehicle position estimating unit 59 of the positioning apparatus is realized by a processing circuit. That is, the positioning apparatus includes the processing circuit which calculates the momentary moving distance, speed, and longitudinal acceleration of the vehicle, calculates as the zero point the output of each axis in the triaxial acceleration sensor 3 when the vehicle is performing the horizontal plane uniform linear traveling, subtracts the zero point calculated by the triaxial acceleration sensor zero point calculating unit 52 from the output of the triaxial acceleration sensor 3, calculates as the zero point the outputs of each axis of the triaxial angular velocity sensor 4 when the angular velocity is not generated during stop, subtracts the zero point calculated by the triaxial angular velocity sensor zero point calculating unit 54 from the output of the triaxial angular velocity sensor 4, calculates the attachment angles of the three axes, coordinate-transforms the output of the triaxial acceleration calculating unit 53 into the vehicle body coordinate system, coordinate-transforms the output of the triaxial angular velocity calculating unit 55 into the vehicle body coordinate system, and estimates the position, the azimuth direction, the attitude angle, and the speed of the subject vehicle. The processing circuit is a processor 6 (a central processing unit, a processing device, an arithmetic operation device, a microprocessor, a microcomputer, or a Digital Signal Processor (DSP)) which executes a program stored in a memory 7.

Each function of the distance measuring unit 51, the triaxial acceleration sensor zero point calculating unit 52, the triaxial acceleration calculating unit 53, the triaxial angular velocity sensor zero point calculating unit 54, the triaxial angular velocity calculating unit 55, the apparatus housing attachment angle calculating unit 56, the triaxial acceleration coordinate transforming unit 57, the triaxial angular velocity coordinate transforming unit 58, and the subject vehicle position estimating unit 59 of the positioning apparatus is realized by software, firmware or a combination of the software and the firmware. The software or the firmware is described as a program and is stored in the memory 7. The processing circuit realizes the function of each unit by reading and executing the program stored in the memory 7. That is, the positioning apparatus includes the memory 7 which stores the program for eventually executing a step of calculating the momentary moving distance, speed, and longitudinal acceleration of the vehicle, a step of calculating as the zero point the output of each axis in the triaxial acceleration sensor 3 when the vehicle is performing the horizontal plane uniform linear traveling, a step of subtracting the zero point calculated by the triaxial acceleration sensor zero point calculating unit 52 from the output of the triaxial acceleration sensor 3, a step of calculating as the zero point the outputs of each axis of the triaxial angular velocity sensor 4 when the angular velocity is not generated during stop, a step of subtracting the zero point calculated by the triaxial angular velocity sensor zero point calculating unit 54 from the output of the triaxial angular velocity sensor 4, a step of calculating the attachment angles of the three axes, a step of coordinate-transforming the output of the triaxial acceleration calculating unit 53 into the vehicle body coordinate system, a step of coordinate-transforming the output of the triaxial angular velocity calculating unit 55 into the vehicle body coordinate system, and a step of estimating the position, the azimuth direction, the attitude angle, and the speed of the subject vehicle. These programs cause a computer to execute processes or methods of the distance measuring unit 51, the triaxial acceleration sensor zero point calculating unit 52, the triaxial acceleration calculating unit 53, the triaxial angular velocity sensor zero point calculating unit 54, the triaxial angular velocity calculating unit 55, the apparatus housing attachment angle calculating unit 56, the triaxial acceleration coordinate transforming unit 57, the triaxial angular velocity coordinate transforming unit 58, and the subject vehicle position estimating unit 59. Here, the memory corresponds to nonvolatile or volatile semiconductor memories such as a Random Access Memory (RAM), a Read Only Memory (ROM), a flash memory, an Erasable Programmable Read Only Memory (EPROM), an Electrically Erasable Programmable Read Only Memory (EEPROM), a magnetic disk, a flexible disk, an optical disk, a compact disk, a mini disk, and a Digital Versatile Disk (DVD).

Next, the operation of the positioning apparatus will be described.

FIG. 3 is a flowchart showing an example of the operation of the positioning apparatus. In this regard, the operation shown in FIG. 3 is performed per predetermined cycle.

In step S101, the controller 5 determines whether or not initialization is necessary in this cycle. When initialization is necessary, the process proceeds to step S102. On the other hand, when the initialization is not necessary, the process proceeds to step S103.

In step S102, the controller 5 initializes positioning processing.

In step S103, the distance measuring unit 51 calculates the moving distance by multiplying the number of pulse signals measured by the speed sensor 2 in this cycle with a coefficient converted into a distance, calculates the speed from the differentiation of the moving distance, and calculates the longitudinal acceleration from the differentiation of the speed.

In step S104, the controller 5 determines whether or not the vehicle is stopped based on the speed calculated by the distance measuring unit 51 in step S103. When the vehicle is stopped, the process proceeds to step S105. On the other hand, when the vehicle is not stopped (i.e., the vehicle is traveling), the process proceeds to step S106.

In step S105, for the angular velocities (the roll rate, the pitch rate, and the yaw rate) output from the triaxial angular velocity sensor 4 during stop, the triaxial angular velocity sensor zero point calculating unit 54 calculates the angular velocity when the angular velocity equal to or greater than the predetermined threshold is not generated, as the zero point of the angular velocity output from the triaxial angular velocity sensor 4.

In step S106, the triaxial angular velocity calculating unit 55 calculates time integration of the angular velocity obtained by subtracting the zero point of the angular velocity calculated by the triaxial angular velocity sensor zero point calculating unit 54 from the angular velocity output from the triaxial angular velocity sensor 4 during traveling as the attitude angles (the roll angle, the pitch angle, and the yaw angle) in the sensor coordinate system.

In step S107, the triaxial acceleration sensor zero point calculating unit 52 determines whether or not the pitch direction attachment angle and the roll direction attachment angle have already been calculated by the apparatus housing attachment angle calculating unit 56. In the case where the pitch direction attachment angle and the roll direction attachment angle have already been calculated by the apparatus housing attachment angle calculating unit 56, the process proceeds to step S110. Meanwhile, in the case where the pitch direction attachment angle and the roll direction attachment angle are not calculated by the apparatus housing attachment angle calculating unit 56, the process proceeds to step S108.

In step S108, the triaxial acceleration sensor zero point calculating unit 52 determines whether or not the vehicle is stopped based on the speed calculated by the distance measuring unit 51 in step S103. When the vehicle is stopped, the process proceeds to step S109. On the other hand, when the vehicle is not stopped, the process proceeds to step S110.

In step S109, the triaxial acceleration sensor zero point calculating unit 52 checks that a waveform of the acceleration output from the triaxial acceleration sensor 3 during stop is in a constant state (within a predetermined range), and calculates this acceleration as a temporary zero point of the acceleration output from the triaxial acceleration sensor 3 in the sensor coordinate system.

In step S110, the triaxial acceleration sensor zero point calculating unit 52 determines whether or not a positioning result has been received from the GNSS receiver 1. In the case where the positioning result has been received, the process proceeds to step S111. On the other hand, when the positioning result is not received, the process proceeds to step S113.

In step S111, the triaxial acceleration sensor zero point calculating unit 52 determines whether or not the vehicle is performing the horizontal plane uniform linear traveling based on the triaxial speeds (the longitudinal direction speed, the lateral direction speed, and the vertical direction speed) included in the positioning result calculated by the GNSS receiver 1, the longitudinal acceleration calculated by the distance measuring unit 51, and the acceleration of each axis output from the triaxial acceleration sensor 3. More specifically, the triaxial acceleration sensor zero point calculating unit 52 determines whether or not the vehicle is performing the horizontal plane uniform linear traveling when a fluctuation of each of the triaxial speeds (the longitudinal direction speed, the lateral direction speed, and the vertical direction speed) included in the positioning result calculated by the GNSS receiver 1, the longitudinal acceleration calculated by the distance measuring unit 51, and the acceleration of each axis output from the triaxial acceleration sensor 3 is equal to or less than a predetermined threshold. When the vehicle is performing the horizontal plane uniform linear traveling, the process proceeds to step S112. On the other hand, when the vehicle is not performing the horizontal plane uniform linear traveling, the process proceeds to step S113.

In step S112, the triaxial acceleration sensor zero point calculating unit 52 calculates the acceleration output from the triaxial acceleration sensor 3 as the zero point of the acceleration output from the triaxial acceleration sensor 3 in the sensor coordinate system.

In step S113, the triaxial acceleration calculating unit 53 calculates, as the acceleration in the sensor coordinate system, an acceleration obtained by subtracting the zero point (the zero point calculated in step S109 and step S112) of the acceleration calculated by the triaxial acceleration sensor zero point calculating unit 52 from the acceleration output from the triaxial acceleration sensor 3 during traveling.

In step S114, the apparatus housing attachment angle calculating unit 56 calculates the attachment angle of the positioning apparatus. Specifically, when the triaxial acceleration sensor zero point calculating unit 52 calculates the zero points ($A_S x_{bias}$, $A_S y_{bias}$, and in step S112, the apparatus housing attachment angle $A_S z_{bias}$) calculating unit 56 calculates the pitch direction attachment angle $\phi_p$ and the roll direction attachment angle $\phi_r$ of the housing of the positioning device by Formula (48) and Formula (49) by using the zero point.

[Mathematical Formula 22]

$$\phi_p = \tan^{-1}\{-A_s x_{bias}/\sqrt{(A_s y_{bias}^2 + A_s z_{bias}^2)}\} \quad (48)$$

$$\phi_r = \tan^{-1}\{A_s y_{bias}/\sqrt{(A_s x_{bias}^2 + A_s z_{bias}^2)}\} \quad (49)$$

Further, when the zero point is not calculated in step S112 and the triaxial acceleration sensor zero point calculating unit 52 calculates the temporary zero points (temporary $A_S x_{bias}$, temporary $A_S y_{bias}$, and temporary $A_S z_{bias}$) in step S109, the apparatus housing attachment angle calculating unit 56 calculates a pitch direction temporary attachment angle $\phi_{p\text{-}tentative}$ and a roll direction temporary attachment angle $\phi_{r\text{-}tentative}$ of the housing of the positioning device by Formula (50) and Formula (51) by using the zero points.

[Mathematical Formula 23]

$$\phi_{p\text{-}tentative} = \tan^{-1}\{-\text{temporary } A_s x_{bias}/\sqrt{(\text{temporary}A_s y_{bias}^2 + \text{temporary}A_s z_{bias}^2)}\} \quad (50)$$

$$\phi_{p\text{-}tentative} = \tan^{-1}\{\text{temporary } A_s y_{bias}/\sqrt{(\text{temporary}A_s x_{bias}^2 + \text{temporary}A_s z_{bias}^2)}\} \quad (50)$$

Figure 4:
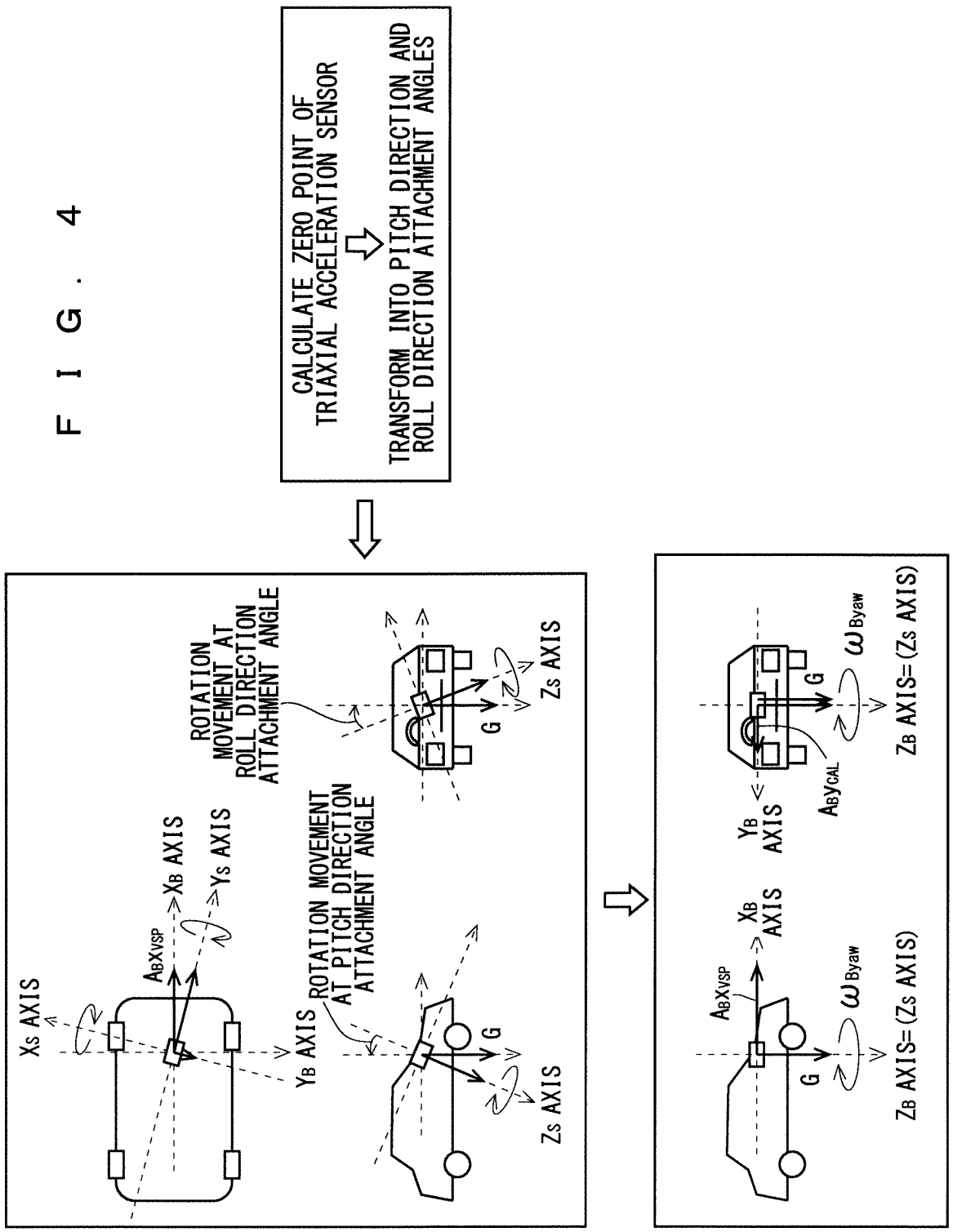
FIG. 4 is a view for explaining a transformation state from a sensor coordinate system to a vehicle body coordinate system based on a pitch direction attachment angle and a roll direction attachment angle according to the first embodiment of the present invention.

In step S115, as shown in FIG. 4, the triaxial angular velocity coordinate transforming unit 58 coordinate-transforms the attitude angle of the sensor coordinate system into the attitude angle of the vehicle body coordinate system by Formula (48) and Formula (49) (or Formula (50) and Formula (51)), based on the attachment angle (or a temporary attachment angle) calculated by the apparatus housing attachment angle calculating unit 56 in step S114.

In step S116, the triaxial acceleration coordinate transforming unit 57 coordinate-transforms the acceleration of the sensor coordinate system into the acceleration of the vehicle body coordinate system by Formula (48) and Formula (49) (or Formula (50) and Formula (51)), based on the attachment angle (or a temporary attachment angle) calculated by the apparatus housing attachment angle calculating unit 56 in step S114. This coordinate transformation enables the following matters.

(1) The $Z_S$ axis of the sensor coordinate system and the $Z_B$ axis of the vehicle body coordinate system can be synthesized, and the yaw rate of the vehicle body coordinate system can be restored.

(2) The normal acceleration (lateral acceleration) can be calculated based on the yaw rate of the vehicle body coordinate system and the speed of the $X_B$ axis of the vehicle body coordinate system calculated by the distance measuring unit 51.

(3) The yaw direction attachment angle can be calculated based on the longitudinal acceleration, the lateral acceleration, the gravity, and the yaw rate (described in detail in the second embodiment and subsequent embodiments).

In step S117, the subject vehicle position estimating unit 59 updates the subject vehicle position. Specifically, when all the attachment angles are not calculated by the apparatus housing attachment angle calculating unit 56, the subject vehicle position estimating unit 59 updates subject vehicle position information based on an angle obtained by synthesizing the attitude angles (the roll angle, the pitch angle, and the yaw angle) in the sensor coordinate system calculated by the triaxial angular velocity calculating unit 55 in step S106, and the moving distance calculated by the distance measuring unit 51 in step S103.

Further, when only the yaw direction attachment angle is not calculated by the apparatus housing attachment angle calculating unit 56, the subject vehicle position estimating unit 59 updates two-dimensional subject vehicle position based on the moving distance and the yaw angle of the vehicle body coordinate system.

When the yaw direction attachment angle is calculated by the apparatus housing attachment angle calculating unit 56, the subject vehicle position estimating unit 59 updates three-dimensional subject vehicle position information based on the moving distance and the attitude angle of the vehicle body coordinate system.

In step S118, the subject vehicle position estimating unit 59 determines whether or not the positioning result has been received from the GNSS receiver 1. In the case where the positioning result has been received, the process proceeds to step S119. On the other hand, when the positioning result is not received, the process ends.

In step S119, the subject vehicle position estimating unit 59 appropriately corrects the subject vehicle position information based on the positioning result according to respective prediction errors of the moving distance, the attitude angle, and the positioning result.

As described above, according to the first embodiment, outputs from different detecting means such as the GNSS receiver 1, the speed sensor 2, and the triaxial acceleration sensor 3 are used. Thus, even when the attachment angles are not calculated, it is possible to determine whether or not the vehicle is performing horizontal plane uniform linear traveling. Consequently, it is possible to accurately calculate the zero point of the acceleration output from the triaxial acceleration sensor in the sensor coordinate system during traveling. Consequently, even when a temperature drift fluctuates the zero point, the zero point can be quickly calculated (corrected) even outside the road such as a parking lot. When the technique (Japanese Patent No. 5,606,656) previously disclosed by the inventor of the present invention is adopted, it is possible to determine whether or not the vehicle is performing horizontal plane uniform linear traveling by using the speeds of the three axes with higher reliability calculated by the GNSS receiver 1.

Further, it is possible to calculate the pitch direction attachment angle and the roll direction attachment angle based on the zero point of the acceleration output from the triaxial acceleration sensor 3, and coordinate-transform the angular velocity output from the triaxial angular velocity sensor 4 from the sensor coordinate system into the vehicle body coordinate system. Consequently, there is no restriction on the range of the attachment angle in the pitch direction and the roll direction. The pitch direction attachment angle and the roll direction attachment angle calculated in this way are used to accurately calculate the yaw angle in particular among the attitude angles coordinate-transformed from the sensor coordinate system into the vehicle body coordinate system in a horizontal plane or a gentle inclined plane. Consequently, the two-dimensional subject vehicle position updated by using the yaw angle also becomes accurate.

In the first embodiment, a case has been described where the GNSS receiver 1 receives the radio waves of GPS satellites and measures the subject vehicle position. However, the present invention is not limited thereto. The GNSS receiver 1 is not limited to GPS satellites but may also receive radio waves such as a Global Navigation Satellite System (GLONASS) satellite, a BeiDou satellite, a Galileo satellite, or a quasi-zenith satellite, and measure the subject vehicle position.

The case where Formulas (48) to (51) are used to calculate the attachment angle from the zero point or the temporary zero point of the output of each axis of the triaxial acceleration sensor 3 has been described. However, other calculation formulas may be used The above horizontal plane uniform linear traveling may be determined by using a zero point correction condition of a uniaxial acceleration sensor of the technique (Japanese Patent No. 5,606,656) previously disclosed by the inventor of the present invention.

Second Embodiment

The second embodiment of the present invention has a feature in processing performed by a apparatus housing attachment angle calculating unit 56. Other configurations and operations are the same as those in the first embodiment, and therefore descriptions thereof will be omitted.

Figure 5:
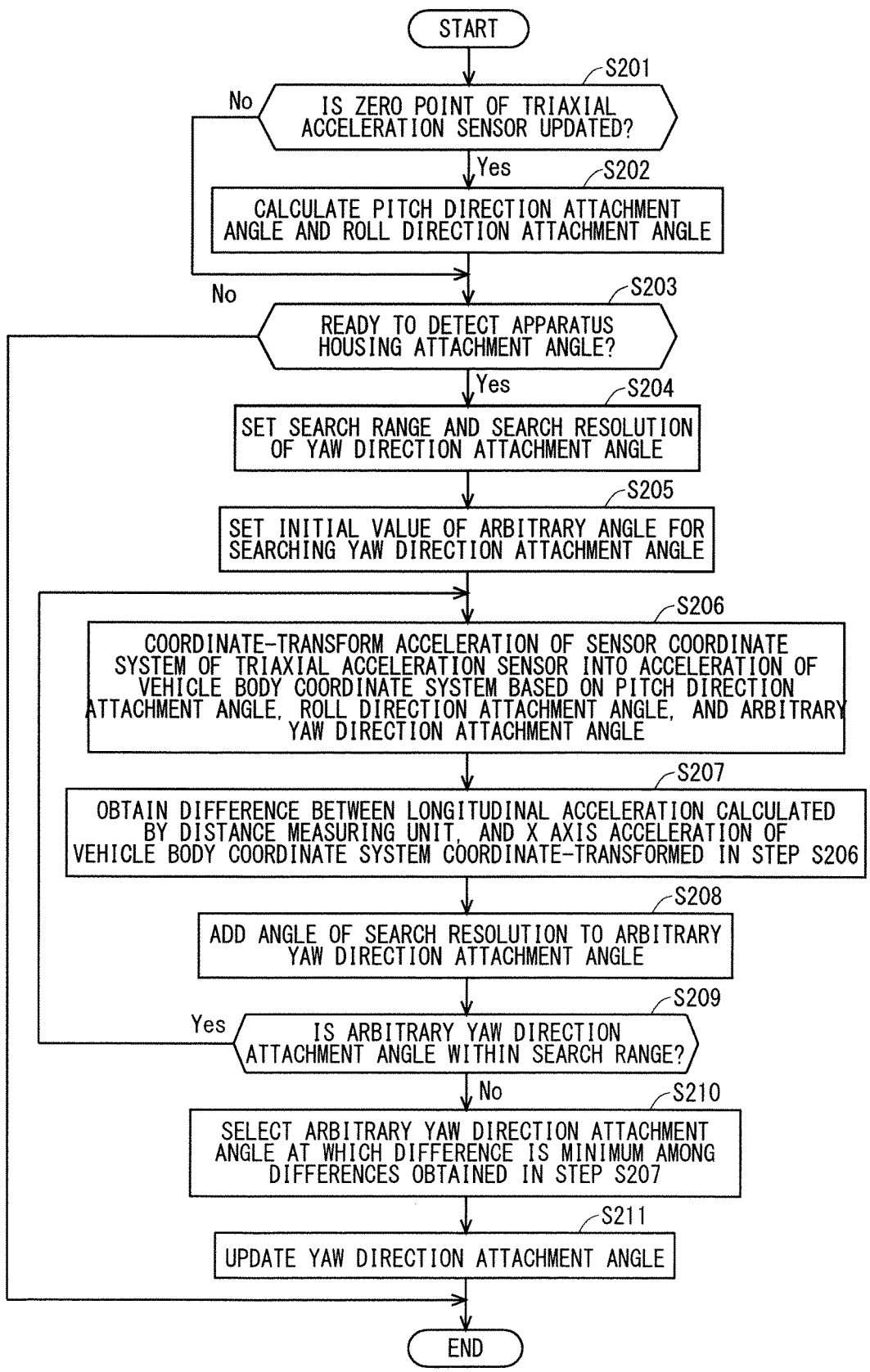
FIG. 5 is a flowchart showing an example of an operation of a apparatus housing attachment angle calculating unit according to a second embodiment of the present invention.

FIG. 5 is a flowchart showing an example of the operation of the apparatus housing attachment angle calculating unit 56 according to the second embodiment. The operation shown in FIG. 5 corresponds to the processing in step S114 of FIG. 3.

In step S201, the apparatus housing attachment angle calculating unit 56 determines whether or not a triaxial acceleration sensor zero point calculating unit 52 has updated (calculated) the zero point of the acceleration output from a triaxial acceleration sensor 3 in the sensor coordinate system. Specifically, in step S112 in FIG. 3, the apparatus housing attachment angle calculating unit 56 determines whether or not the triaxial acceleration sensor zero point calculating unit 52 has calculated the zero point of the acceleration output from the triaxial acceleration sensor 3 in the sensor coordinate system. When the zero point is updated, the process proceeds to step S202. On the other hand, when the zero point is not updated, the process proceeds to step S203.

In step S202, the apparatus housing attachment angle calculating unit 56 calculates a pitch direction attachment angle $\phi_p$ and a roll direction attachment angle $\phi_r$ of the housing of the positioning device by Formula (48) and Formula (49) by using the zero point of the acceleration calculated by the triaxial acceleration sensor zero point calculating unit 52.

In step S203, the apparatus housing attachment angle calculating unit 56 determines whether or not it is ready to calculate the attachment angle of the housing of the positioning apparatus in response to the calculation result of the triaxial acceleration sensor zero point calculating unit 52. Specifically, the apparatus housing attachment angle calculating unit 56 determines that it is ready to calculate the attachment angle when all of the following four conditions are satisfied.

(1) Zero points ($A_S x_{bias}$, $A_S y_{bias}$, and $A_S z_{bias}$) of the acceleration output by the triaxial acceleration sensor 3 in the sensor coordinate system has been calculated.

(2) The angle obtained by synthesizing the attitude angles (the roll angle, the pitch angle, and the yaw angle) of the sensor coordinate system calculated by a triaxial angular velocity calculating unit 55 is equal to or less than a predetermined threshold.

(3) The longitudinal acceleration calculated by the distance measuring unit 51 is equal to or greater than a predetermined threshold.

(4) The fluctuation of the Z axis acceleration when the acceleration output by the triaxial acceleration sensor 3 in the sensor coordinate system is transformed by Formula (48) and Formula (49) based on the pitch direction attachment angle and the roll direction attachment angle is within a predetermined range.

When it is ready to calculate the attachment angle (when all of the four conditions are satisfied), the process proceeds to step S204. On the other hand, when it is not ready to calculate the attachment angle (when all of the four conditions are not satisfied), the process ends.

In step S204, the apparatus housing attachment angle calculating unit 56 sets a search range (angle range) and a search resolution (a resolution of the angle in the yaw direction) of the yaw direction attachment angle. For example, when the yaw direction attachment angle is not yet calculated, the apparatus housing attachment angle calculating unit 56 sets the search range to −180 degrees to +180 degrees and the search resolution to 10 degrees. Further, when the yaw direction attachment angle is already calculated, the apparatus housing attachment angle calculating unit 56 sets the search range to −15 degrees to +15 degrees and the search resolution to 1 degree.

In step S205, the apparatus housing attachment angle calculating unit 56 sets a lower limit angle of the search range as an initial value of an arbitrary angle (arbitrary yaw direction attachment angle) for searching the yaw direction attachment angle.

Figure 6:
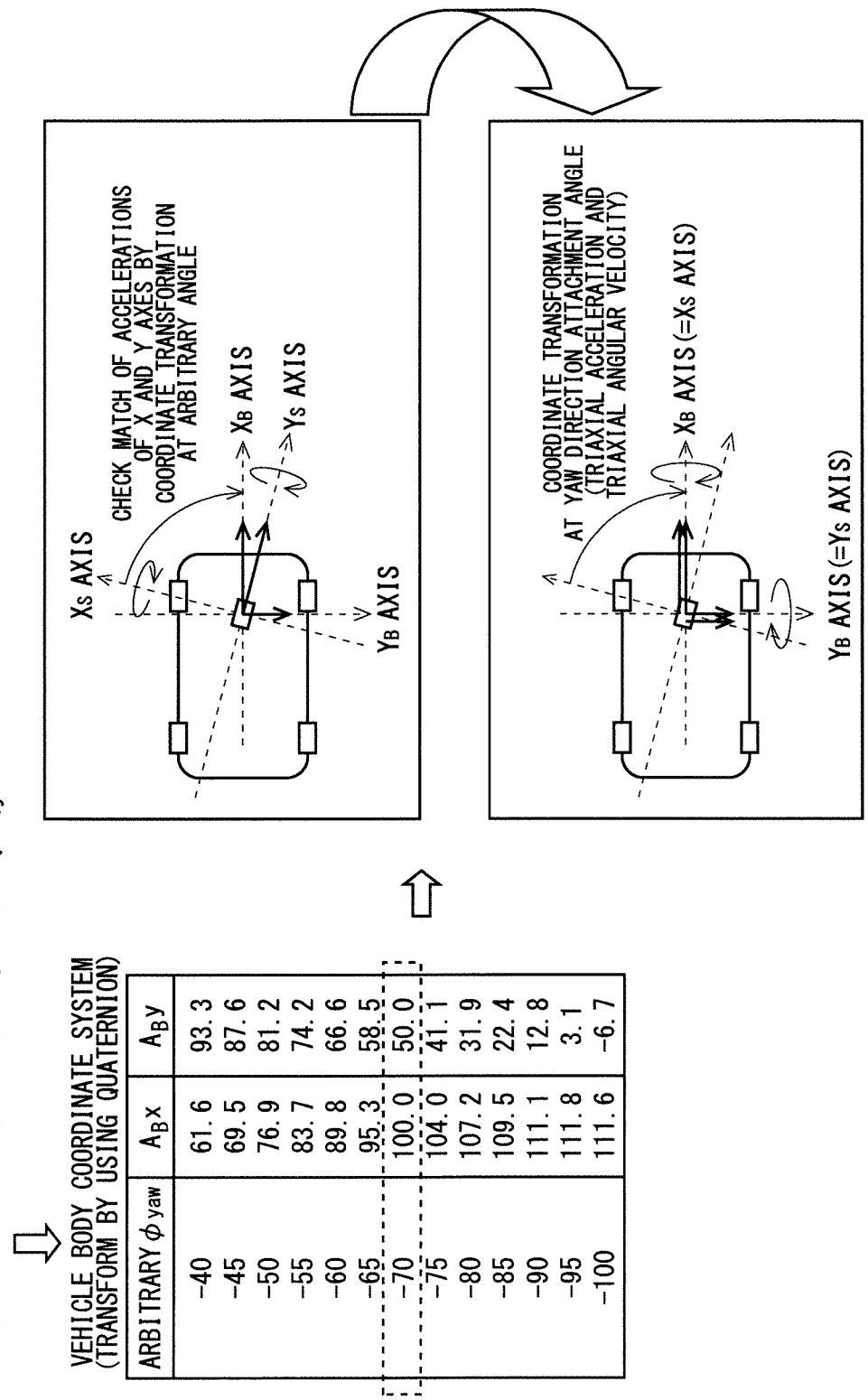
FIG. 6 is a view for explaining a transformation state from the sensor coordinate system to a temporary vehicle body coordinate system based on an arbitrary angle in a yaw direction according to the second embodiment of the present invention.

In step S206, the apparatus housing attachment angle calculating unit 56 coordinate-transforms the acceleration of the sensor coordinate system of the triaxial acceleration sensor 3 into the acceleration of the vehicle body coordinate system by Formula (48) and Formula (49) based on the pitch direction attachment angle, the roll direction attachment angle, and an arbitrary yaw direction attachment angle. Specifically, as shown in FIG. 6, the apparatus housing attachment angle calculating unit 56 coordinate-transforms an $X_S$ axis acceleration and a $Y_S$ axis acceleration of the sensor coordinate system into a temporary $X_B$ axis acceleration and $Y_B$ axis acceleration of the temporary vehicle body coordinate system.

In step S207, the apparatus housing attachment angle calculating unit 56 obtains a difference between the longitudinal acceleration calculated by a distance measuring unit 51 and the temporary X axis acceleration $A_B x$ of the vehicle body coordinate system coordinate-transformed in step S206.

In step S208, the apparatus housing attachment angle calculating unit 56 adds the search resolution angle to an arbitrary yaw direction attachment angle.

In step S209, the apparatus housing attachment angle calculating unit 56 determines whether or not the arbitrary yaw direction attachment angle is within the search range. When the arbitrary yaw direction attachment angle is within the search range, the process proceeds to step S206. On the other hand, when the arbitrary yaw direction attachment angle is not within the search range, the process proceeds to step S210.

In step S210, the apparatus housing attachment angle calculating unit 56 selects the arbitrary yaw direction attachment angle at which the difference is minimum (having the highest match) among the differences obtained in step S207.

In step S211, the apparatus housing attachment angle calculating unit 56 updates (calculates) the yaw direction attachment angle by Formula (52) by using a statistical processing result of the arbitrary yaw direction attachment angle selected in step S210.

$$\text{Yaw direction attachment angle}+=\text{arbitrary yaw direction attachment angle(statistical processing result)} \quad (52)$$

However, −180 degrees to 180 degrees

As described above, according to the second embodiment, it is possible to calculate the pitch direction attachment angle and the roll direction attachment angle, and then calculate the yaw direction attachment angle only by a speed sensor 2, the triaxial acceleration sensor 3, and a triaxial angular velocity sensor 4 irrespectively of a reception state of a GNSS receiver 1. Consequently, it is possible to calculate the yaw direction attachment angle even when the vehicle is moving in a wide indoor parking lot. For the X axis acceleration of the vehicle body coordinate system, it is possible to check a match state between the longitudinal acceleration calculated based on the output of the speed sensor 2 and the X axis acceleration calculated based on the output of the triaxial acceleration sensor 3, and search the yaw direction attachment angle. Consequently, there is no restriction on the range of the yaw direction attachment angle, and it is possible to stably calculate the yaw direction attachment angle.

Further, it is possible to change the search range and the search resolution and check only validity of the yaw direction attachment angle according to the calculation situation of the yaw direction attachment angle. Consequently, when the yaw direction attachment angle is not yet calculated, it is possible to quickly calculate the yaw direction attachment angle and then slowly calculate the yaw direction attachment angle. In this case, necessary minimum calculation processing is performed, and therefore a processing load is reduced. It is possible to calculate the yaw direction attachment angle, then coordinate-transform the angular velocity of the triaxial angular velocity sensor 4 from the sensor coordinate system into the vehicle body coordinate system irrespectively of the horizontal plane or the inclined plane, and also accurately calculate the attitude angle other than the yaw angle. Consequently, it is possible to provide an unconventional remarkable effect that the three-dimensional subject vehicle position can be more accurately estimated.

In the second embodiment, a case has been described where a plurality of arbitrary yaw direction attachment angles within the search range is simultaneously checked at the identical time for the X axis acceleration. However, the present invention is not limited thereto. For example, by changing an arbitrary yaw direction attachment angle per predetermined time, and checking the match, it is also possible to calculate the yaw direction attachment angle.

In the above case, during traveling, only information output from each sensor may be collected, and the collected information may be collectively processed during stop.

In the second embodiment, narrowing the search range and reducing the search resolution as the yaw direction attachment angle is calculated has been described. However, the present invention is not limited thereto. For example, when the calculation of the yaw direction attachment angle converges, only the match of the yaw direction attachment angle may be checked to check only the validity of the yaw direction attachment angle. When the check is likely to change the attachment angle to a different attachment angle, the yaw direction attachment angle may be calculated with a predetermined search range and search resolution.

Third Embodiment

The third embodiment of the present invention has a feature in processing performed by an apparatus housing attachment angle calculating unit 56. Other configurations and operations are the same as those in the first and second embodiments, and therefore descriptions thereof will be omitted.

Figure 7:
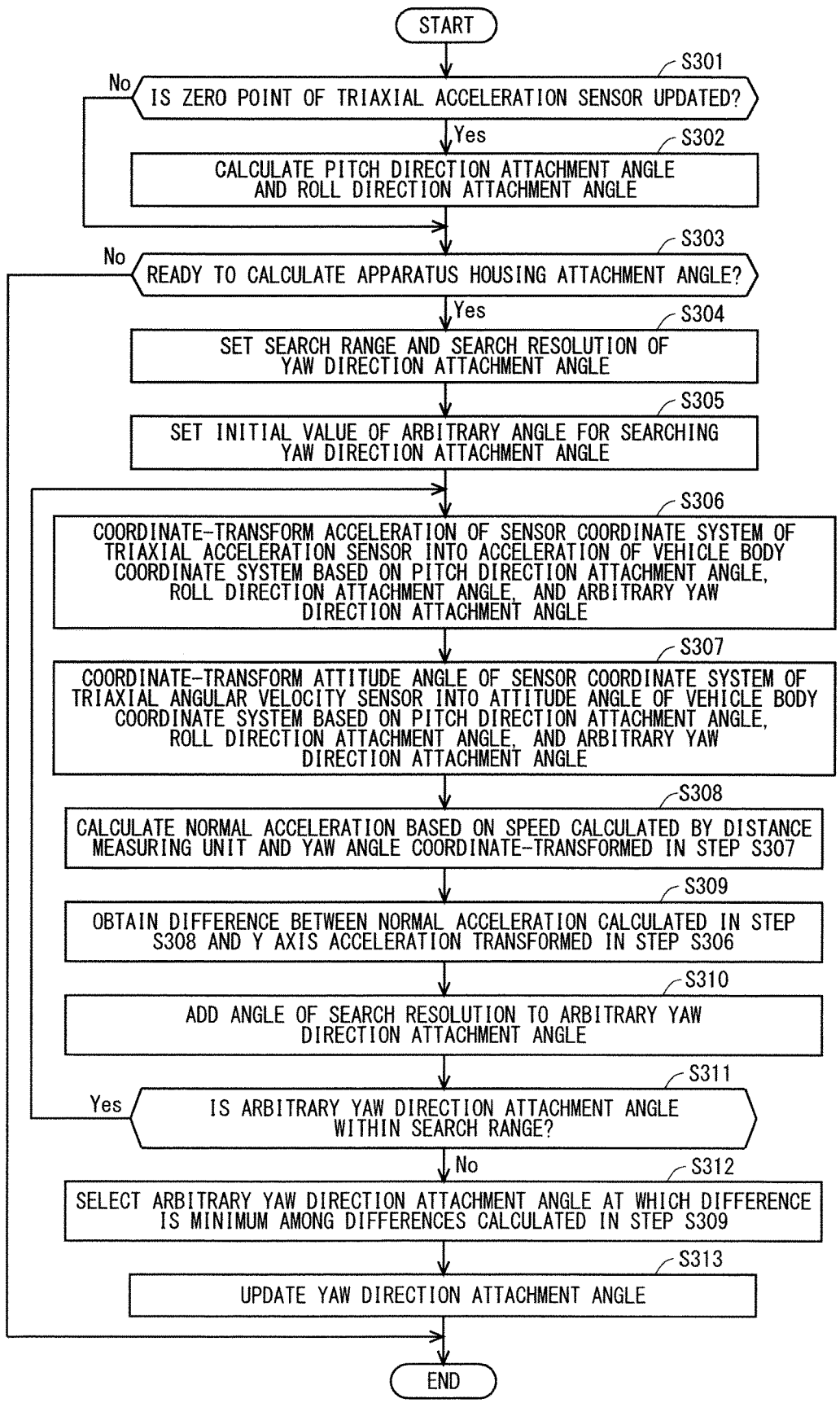
FIG. 7 is a flowchart showing an example of an operation of the apparatus housing attachment angle calculating unit according to a third embodiment of the present invention.

FIG. 7 is a flowchart showing an example of the operation of the apparatus housing attachment angle calculating unit 56 according to the third embodiment. The operation shown in FIG. 7 corresponds to the processing in step S114 of FIG. 3. Step S301 to step S306 in FIG. 7 are the same as step S201 to step S206 in FIG. 5, and therefore descriptions thereof will be omitted.

In step S307, the apparatus housing attachment angle calculating unit 56 coordinate-transforms the attitude angle of the sensor coordinate system into the attitude angle of the vehicle body coordinate system of a triaxial angular velocity sensor 4 by Formula (48) and Formula (49) based on the pitch direction attachment angle, the roll direction attachment angle, and an arbitrary yaw direction attachment angle.

In step S308, the apparatus housing attachment angle calculating unit 56 calculates a normal acceleration based on a speed calculated by a distance measuring unit 51 and a yaw angle transformed in step S307.

In step S309, the apparatus housing attachment angle calculating unit 56 obtains a difference between the normal acceleration calculated in step S308 and a Y axis acceleration transformed in step S306.

In step S310, the apparatus housing attachment angle calculating unit 56 adds a search resolution angle to an arbitrary yaw direction attachment angle.

In step S311, the apparatus housing attachment angle calculating unit 56 determines whether or not the arbitrary yaw direction attachment angle is within the search range. When the arbitrary yaw direction attachment angle is within the search range, the process proceeds to step S306. On the other hand, when the arbitrary yaw direction attachment angle is not within the search range, the process proceeds to step S312.

In step S312, the apparatus housing attachment angle calculating unit 56 selects the arbitrary yaw direction attachment angle at which the difference is minimum among the differences obtained in step S309.

In step S313, the apparatus housing attachment angle calculating unit 56 updates (calculates) the yaw direction attachment angle by Formula (52) by using a statistical processing result of the arbitrary yaw direction attachment angle selected in step S312.

As described above, similar to the second embodiment, according to the third embodiment, it is possible to calculate the pitch direction attachment angle and the roll direction attachment angle, and then calculate the yaw direction attachment angle only by a speed sensor 2, a triaxial acceleration sensor 3, and the triaxial angular velocity sensor 4 irrespectively of a reception state of a GNSS receiver 1. Consequently, it is possible to calculate the yaw direction attachment angle even when the vehicle is moving in a wide indoor parking lot. For the Y axis acceleration of the vehicle body coordinate system, it is possible to check a match state between the normal acceleration calculated in step S308 and the Y axis acceleration calculated based on the output of the triaxial acceleration sensor 3, and search the yaw direction attachment angle. Consequently, there is no restriction on the range of the yaw direction attachment angle, and it is possible to stably calculate the yaw direction attachment angle.

Further, it is possible to change the search range and the search resolution and check only validity of the yaw direction attachment angle according to the calculation situation of the yaw direction attachment angle. Consequently, when the yaw direction attachment angle is not yet calculated, it is possible to quickly calculate the yaw direction attachment angle and then slowly calculate the yaw direction attachment angle. In this case, necessary minimum calculation processing is performed, and therefore a processing load is reduced. It is possible to calculate the yaw direction attachment angle, then coordinate-transform the angular velocity of the triaxial angular velocity sensor 4 from the sensor coordinate system into the vehicle body coordinate system irrespectively of the horizontal plane or the inclined plane, and also accurately calculate the attitude angle other than the yaw angle. Consequently, it is possible to provide an unconventional remarkable effect that the three-dimensional subject vehicle position can be more accurately estimated.

In the third embodiment, a case has been described where a plurality of arbitrary yaw direction attachment angles within the search range are simultaneously checked at the identical time for the Y axis acceleration. However, the present invention is not limited thereto. For example, by changing an arbitrary yaw direction attachment angle per predetermined time, and checking the match, it is also possible to calculate the yaw direction attachment angle.

In the above case, during traveling, only information output from each sensor may be collected, and the collected information may be collectively processed during stop.

In the third embodiment, narrowing the search range and reducing the search resolution as the yaw direction attachment angle is calculated has been described. However, the present invention is not limited thereto. For example, when the calculation of the yaw direction attachment angle converges, only the match of the yaw direction attachment angle may be checked to check only the validity of the yaw direction attachment angle. When the check is likely to change the attachment angle to a different attachment angle, the yaw direction attachment angle may be calculated with a predetermined search range and search resolution.

Fourth Embodiment

The fourth embodiment of the present invention has a feature in processing performed by an apparatus housing attachment angle calculating unit 56. Other configurations and operations are the same as those in the first to third embodiments, and therefore descriptions thereof will be omitted.

Figure 8:
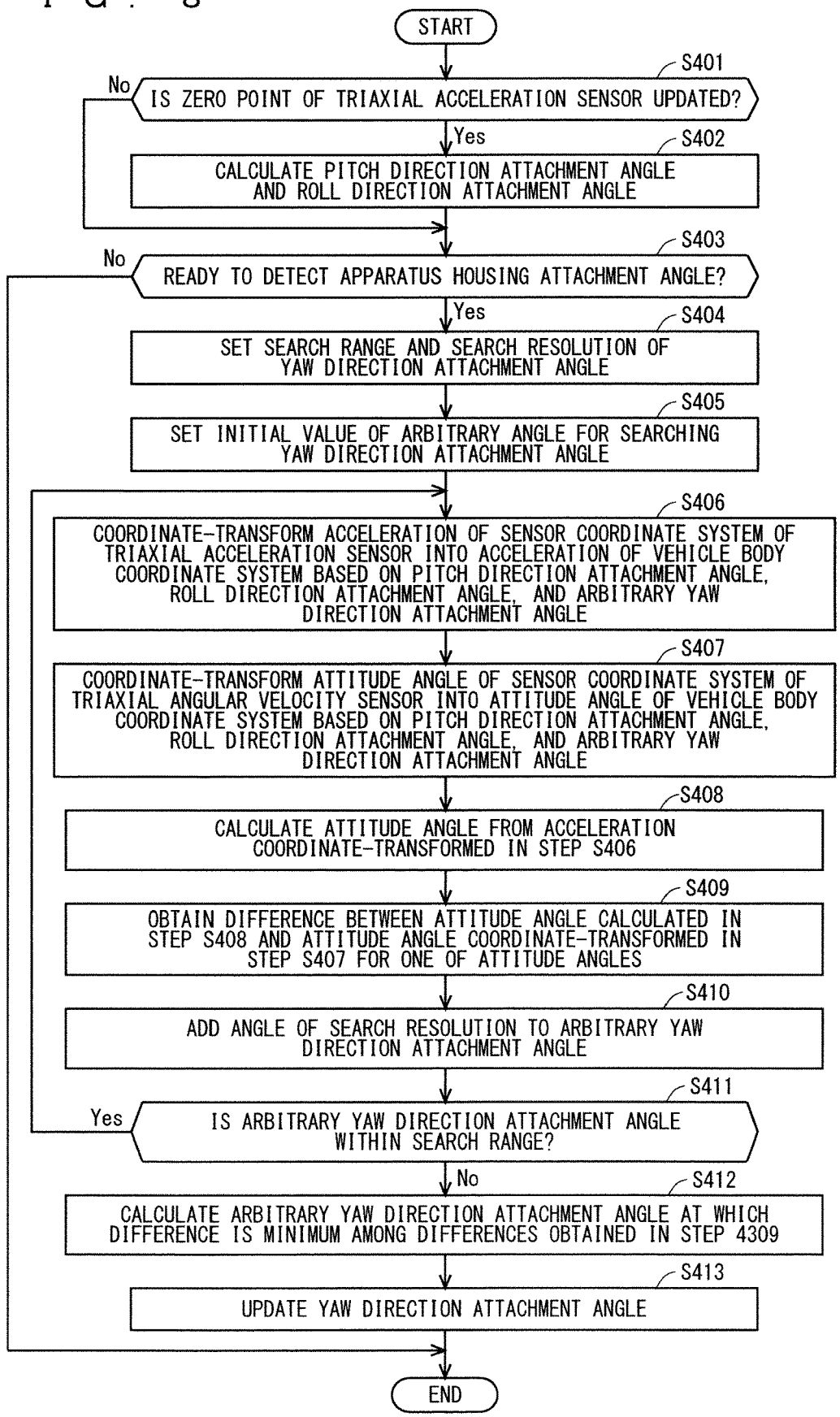
FIG. 8 is a flowchart showing an example of an operation of the apparatus housing attachment angle calculating unit according to a fourth embodiment of the present invention.

FIG. 8 is a flowchart showing an example of an operation of the apparatus housing attachment angle calculating unit 56 according to the fourth embodiment. The operation shown in FIG. 8 corresponds to the processing in step S114 of FIG. 3. Step S401 to step S407 in FIG. 8 are the same as step S301 to step S307 in FIG. 7, and therefore descriptions thereof will be omitted.

Figure 9:
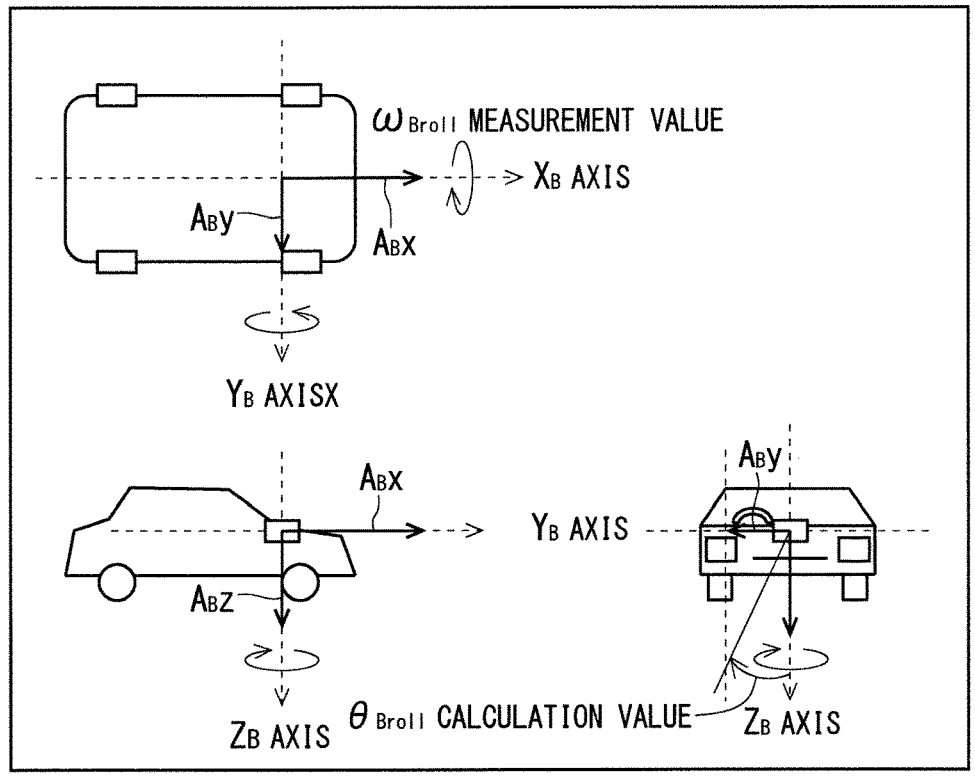
FIG. 9 is a view showing a relationship between a measurement value of a triaxial angular velocity sensor and a calculation value of a triaxial acceleration sensor according to the fourth embodiment of the present invention.
Figure 10:
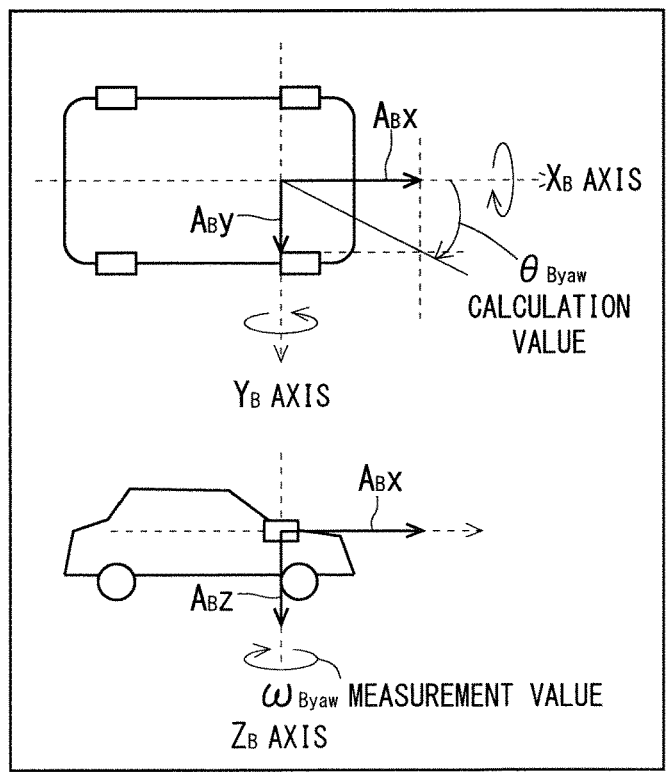
FIG. 10 is a view showing a relationship between a measurement value of the triaxial angular velocity sensor and a calculation value by the triaxial acceleration sensor according to the fourth embodiment of the present invention.
Figure 11:
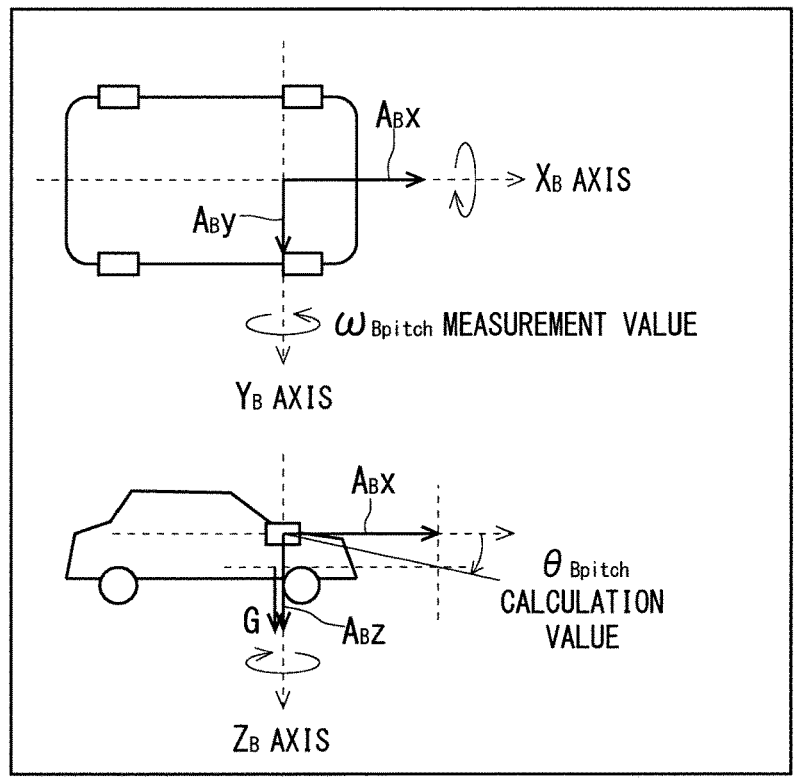
FIG. 11 is a view showing a relationship between a measurement value of the triaxial angular velocity sensor and a calculation value of the triaxial acceleration sensor according to the fourth embodiment of the present invention.

In step S408, as shown in FIGS. 9 to 11, the apparatus housing attachment angle calculating unit 56 calculates an attitude angle from an acceleration coordinate-transformed in step S406 by Formulas (53) to (55).

[Mathematical Formula 24]

$$\theta_{B\ roll} = \tan^{-1}\{A_By/A_Bz\} \quad (53)$$

$$\theta_{B\ pich} = \tan^{-1}\{A_Bx/\sqrt{(A_By^2+A_Bz^2)}\} \quad (54)$$

$$\theta_{B\ yaw} = \tan^{-1}\{-A_By/\sqrt{(A_Bx^2+A_Bz^2)}\} \quad (55)$$

In step S409, the apparatus housing attachment angle calculating unit 56 obtains a difference between the attitude angle calculated in step S408 and the attitude angle coordinate-transformed in step S407 for one of the attitude angles.

In step S410, the apparatus housing attachment angle calculating unit 56 adds a search resolution angle to an arbitrary yaw direction attachment angle.

In step S411, the apparatus housing attachment angle calculating unit 56 determines whether or not the arbitrary yaw direction attachment angle is within the search range. When the arbitrary yaw direction attachment angle is within the search range, the process proceeds to step S406. On the other hand, when the arbitrary yaw direction attachment angle is not within the search range, the process proceeds to step S412.

In step S412, the apparatus housing attachment angle calculating unit 56 selects the arbitrary yaw direction attachment angle at which the difference is minimum among the differences obtained in step S409.

In step S413, the apparatus housing attachment angle calculating unit 56 updates (calculates) the yaw direction attachment angle by Formula (52) by using a statistical processing result of the arbitrary yaw direction attachment angle selected in step S412.

As described above, similar to the second and third embodiments, according to the fourth embodiment, it is possible to calculate the pitch direction attachment angle and the roll direction attachment angle, and then calculate the yaw direction attachment angle only by a speed sensor 2, a triaxial acceleration sensor 3, and a triaxial angular velocity sensor 4 irrespectively of a reception state of a GNSS receiver 1. Consequently, it is possible to calculate the yaw direction attachment angle even when the vehicle is moving in a wide indoor parking lot. For one of the attitude angles of the vehicle body coordinate system, it is possible to check a match state between the attitude angle calculated based on the output of the triaxial acceleration sensor 3 and the attitude angle calculated based on the output of the triaxial angular velocity sensor 4, and search the yaw direction attachment angle. Consequently, there is no restriction on the range of the yaw direction attachment angle, and it is possible to stably calculate the yaw direction attachment angle.

Further, it is possible to change the search range and the search resolution and check only validity of the yaw direction attachment angle according to the calculation situation of the yaw direction attachment angle. Consequently, when the yaw direction attachment angle is not yet calculated, it is possible to quickly calculate the yaw direction attachment angle and then slowly calculate the yaw direction attachment angle. In this case, necessary minimum calculation processing is performed, and therefore a processing load is reduced. It is possible to calculate the yaw direction attachment angle, then coordinate-transform the angular velocity of the triaxial angular velocity sensor 4 from the sensor coordinate system into the vehicle body coordinate system irrespectively of the horizontal plane or the inclined plane, and also accurately calculate the attitude angle other than the yaw angle. Consequently, it is possible to provide an unconventional remarkable effect that the three-dimensional subject vehicle position can be more accurately estimated.

In the fourth embodiment, the case has been described where a plurality of arbitrary yaw direction attachment angles within the search range are simultaneously checked at the identical time for one of the attitude angles (a roll angle, a pitch angle, and a yaw angle). However, the present invention is not limited thereto. For example, by changing an arbitrary yaw direction attachment angle per predetermined time, and checking the match, it is also possible to calculate the yaw direction attachment angle.

In the above case, during traveling, only information output from each sensor may be collected, and the collected information may be collectively processed during stop.

In the fourth embodiment, narrowing the search range and reducing the search resolution as the yaw direction attachment angle is calculated has been described. However, the present invention is not limited thereto. For example, when the calculation of the yaw direction attachment angle converges, only the match of the yaw direction attachment angle may be checked to check only the validity of the yaw direction attachment angle. When the check is likely to change the attachment angle to a different attachment angle, the yaw direction attachment angle may be calculated with a predetermined search range and search resolution.

Fifth Embodiment

The fifth embodiment of the present invention has a feature in performing processing of the integrated second to fourth embodiments. Configurations of a positioning apparatus are the same as those in the first embodiment, and therefore descriptions thereof will be omitted.

A apparatus housing attachment angle calculating unit 56 checks the match of two or more of an X axis acceleration, the Y axis acceleration, and attitude angles (a roll angle, a pitch angle, and a yaw angle) of a temporary vehicle body coordinate system per arbitrary yaw direction attachment angle, (i.e., performs processing which is a combination of step S207 in FIG. 5, step S309 in FIG. 7, and step S409 in FIG. 8), and selects as the yaw direction attachment angle the arbitrary yaw direction attachment angle when the two or more of angles match at the same arbitrary yaw direction attachment angle. Further, after the yaw direction attachment angle is calculated, whether or not the attachment angle has been changed is reliably determined to start calculation of a new attachment angle.

An subject vehicle position estimating unit 59 updates an subject vehicle position based on a moving distance and an attitude angle by using a predetermined Kalman filter, and corrects an subject vehicle position based on a positioning result according to each prediction error of the positioning result, the moving distance, and the attitude angle. In particular, the prediction error of the attitude angle is calculated from the difference between the attitude angles based on the respective outputs of a triaxial acceleration sensor 3 and a triaxial angular velocity sensor 4.

As described above, similar to the second to fourth embodiments, according to the fifth embodiment, it is possible to calculate the pitch direction attachment angle and the roll direction attachment angle, and then calculate the yaw direction attachment angle only by a speed sensor 2, a triaxial acceleration sensor 3, and a triaxial angular velocity sensor 4 irrespectively of a reception state of a GNSS receiver 1. Consequently, it is possible to calculate the yaw direction attachment angle even when the vehicle is moving in a wide indoor parking lot. Further, by checking whether or not the same arbitrary yaw direction attachment angle is obtained for at least two or more of the X axis acceleration, the Y axis acceleration, the pitch angle, the roll angle, and the yaw angle, it is possible to reliably search the yaw direction attachment angle or reliably determine whether or not the attachment angle has been changed.

Further, the attitude angle obtained by coordinate-transforming the sensor coordinate system into the vehicle body coordinate system by using the pitch direction attachment angle, the roll direction attachment angle, and the yaw direction attachment angle is an attitude angle from which an influence of the attachment angle is removed. Consequently, the three-dimensional subject vehicle position updated by using the yaw angle also becomes accurate.

In the fifth embodiment, a case has been described where the prediction error of the attitude angle is obtained from the attitude angles calculated by the triaxial acceleration and the triaxial angular velocity. However, the present invention is not limited thereto. For example, to reduce the influence of the error of the attitude angle due to the temperature drift, the attitude angle calculated by each of the triaxial accelerations and the triaxial angular velocities may be weighted and averaged, and used to estimate the subject vehicle position. Further, the subject vehicle position may be corrected by using a model other than the Kalman filter.

The above-described positioning apparatus is applicable not only to in-vehicle navigation devices, i.e., car navigation devices, but also to Portable Navigation Devices (PNDs) which can be mounted on vehicles, portable communication terminals (e.g., moving telephones, smartphones, and tablet terminals), navigation devices constructed in appropriate combination with servers, and devices other than the navigation devices. In this case, each function or each component of the positioning apparatus is distributedly arranged in each function which constructs the above system.

Figure 24:
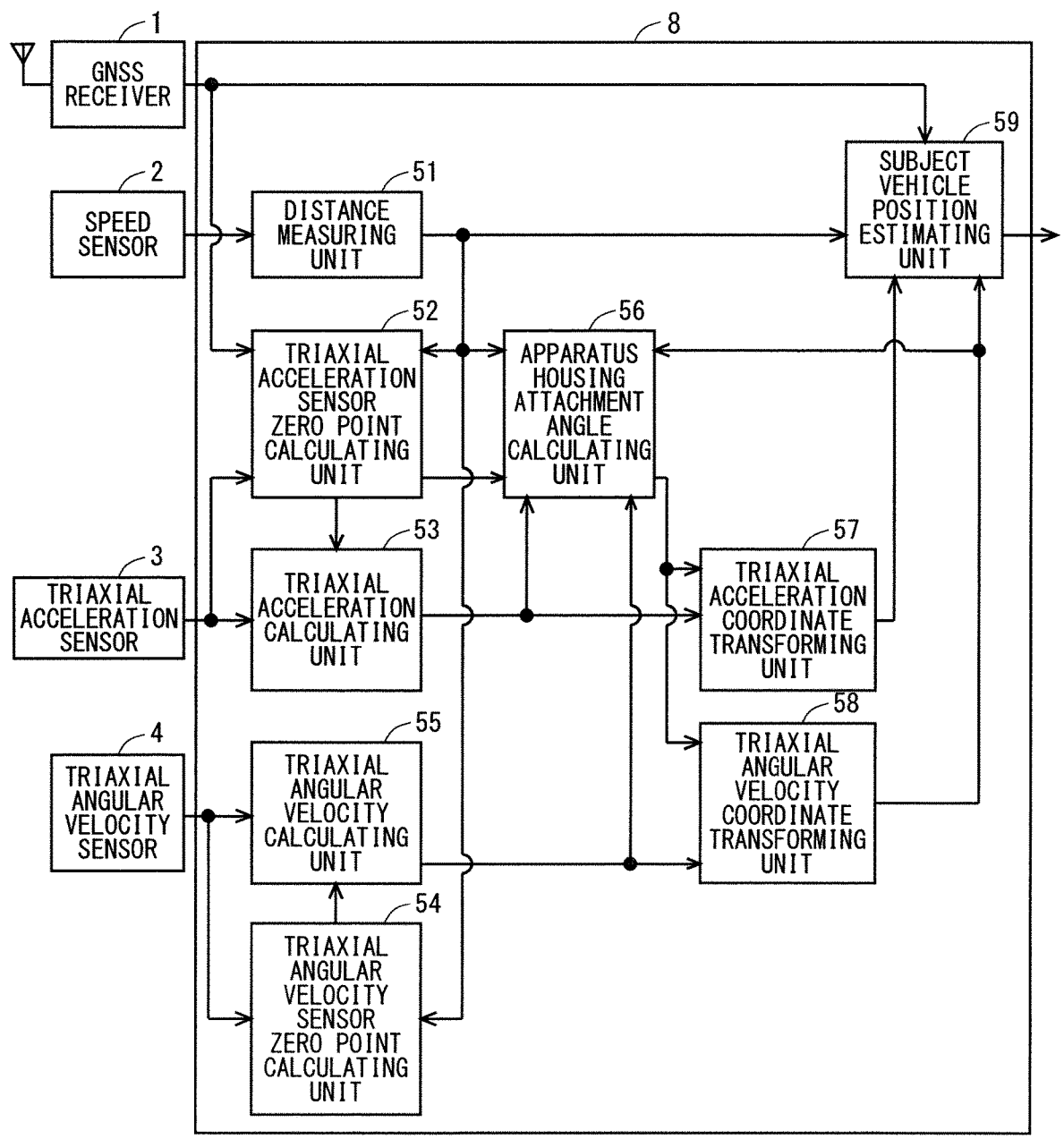
FIG. 24 is a block diagram showing an example of a configuration of a positioning system according to the embodiment of the present invention.

Specifically, as one example, the function of the positioning apparatus can be implemented in the server. For example, as shown in FIG. 24, a vehicle side includes a GNSS receiver 1, a speed sensor 2, the triaxial acceleration sensor 3, and the triaxial angular velocity sensor 4. A server 8 includes a distance measuring unit 51, a triaxial acceleration sensor zero point calculating unit 52, a triaxial acceleration calculating unit 53, a triaxial angular velocity sensor zero point calculating unit 54, a triaxial angular velocity calculating unit 55, the apparatus housing attachment angle calculating unit 56, a triaxial acceleration coordinate transforming unit 57, a triaxial angular velocity coordinate transforming unit 58, and an subject vehicle position estimating unit 59 shown in FIG. 1. Consequently, it is possible to construct a positioning system. Each component of the server 8 may be distributedly appropriately disposed on the server 8 and the vehicle side.

The above configuration can provide the same effect as the above embodiment.

Further, software (positioning method) for executing the operation in the above embodiments may be incorporated in, for example, a server or a moving communication terminal.

More specifically, the positioning method is, for example, a positioning method used by a positioning apparatus of a moving body, the method including: receiving a radio wave from a GPS satellite, calculating at least a current position of the moving body and triaxial speeds including a longitudinal direction speed, a lateral direction speed, and a vertical direction speed, which are speeds of three axes orthogonal to each other in the positioning apparatus, and outputting a calculation result as a positioning result; outputting a pulse signal corresponding to movement of the moving body; detecting triaxial angular velocities which are angular velocities of the three axes orthogonal to each other in the positioning apparatus; detecting triaxial accelerations which are accelerations of the three axes orthogonal to each other in the positioning apparatus; calculating a moving distance, a speed, and a longitudinal acceleration of the moving body based on the pulse signal output per certain cycle; determining whether or not the moving body is performing horizontal plane uniform linear traveling for linearly traveling at a uniform speed on a horizontal plane, based on at least the triaxial speeds calculated as the positioning result, the calculated longitudinal acceleration, and the detected triaxial accelerations while the moving body is traveling, and calculating the triaxial accelerations as a zero point when a determination is made that the moving body is performing the horizontal plane uniform linear traveling; calculating a pitch direction attachment angle and a roll direction attachment angle of the positioning apparatus attached to the moving body based on the zero point of the calculated triaxial accelerations; coordinate-transforming the detected triaxial angular velocities based on the calculated pitch direction attachment angle and the calculated roll direction attachment angle; and estimating the current position of the moving body based on at least a yaw rate obtained from the triaxial angular velocities after the coordinate transformation.

As described above, by incorporating software for executing the operation in the above embodiments into a server or a moving communication terminal to operate, effects similar to those of the above embodiments can be obtained.

The present invention enables appropriate modification and omission of the embodiments within the scope of the invention.

The present invention has been described in detail. However, the above description is illustrative in all aspects, and the present invention is not limited thereto. It is understood that innumerable modifications which are not illustrated can be assumed without departing from the scope of the present invention.

EXPLANATION OF REFERENCE SIGNS

1: GNSS receiver
2: speed sensor
3: triaxial acceleration sensor
4: triaxial angular velocity sensor
5: controller
6: processor
7: memory
51: distance measuring unit
52: triaxial acceleration sensor zero point calculating unit
53: triaxial acceleration calculating unit
54: triaxial angular velocity sensor zero point calculating unit
55: triaxial angular velocity calculating unit
56: apparatus housing attachment angle calculating unit
57: triaxial acceleration coordinate transforming unit
58: triaxial angular velocity coordinate transforming unit
59: subject vehicle position estimating unit

The invention claimed is:

1. A positioning apparatus of a moving body, the apparatus comprising:
a processor to execute a program; and
a memory to store the program which, when executed by the processor, performs processes of,
receiving a radio wave from a GPS satellite, calculating at least a current position of the moving body and triaxial speeds including a longitudinal direction speed, a lateral direction speed, and a vertical direction speed, which are speeds of three axes orthogonal to each other in the positioning apparatus, and outputting a calculation result as a positioning result;
outputting a pulse signal corresponding to movement of the moving body;
detecting triaxial angular velocities which are angular velocities of the three axes orthogonal to each other in the positioning apparatus;
detecting triaxial accelerations which are accelerations of the three axes orthogonal to each other in the positioning apparatus;
calculating a moving distance, a speed, and a longitudinal acceleration of the moving body based on the pulse signal output per certain cycle;
determining whether or not the moving body is performing horizontal plane uniform linear traveling for linearly traveling at a uniform speed on a horizontal plane, based on at least the triaxial speeds which have been calculated, the longitudinal acceleration which has been calculated and the triaxial accelerations which have been detected while the moving body is traveling, and calculating the triaxial accelerations detected as a zero point when a determination is made that the moving body is performing the horizontal plane uniform linear traveling;
calculating a pitch direction attachment angle and a roll direction attachment angle of the positioning apparatus attached to the moving body based on the zero point of the triaxial accelerations which have been calculated;
coordinate-transforming the triaxial angular velocities which have been detected based on the pitch direction attachment angle and the roll direction attachment angle which have been calculated; and
estimating the current position of the moving body based on at least a yaw rate obtained from the triaxial angular velocities which have been transformed.

2. The positioning apparatus according to claim 1, wherein
the program further performs processes of coordinate-transforming the triaxial angular velocities which have been detected based on the pitch direction attachment angle, the roll direction attachment angle, and a predetermined angle in a yaw direction, and further calculating as a yaw direction attachment angle of the positioning apparatus the angle in the yaw direction in a case where an acceleration in a longitudinal direction of the moving body among the triaxial accelerations after the coordinate transformation, and the longitudinal acceleration which has been calculated match, and
the program further performs a process of coordinate-transforming the triaxial angular velocities based on the pitch direction attachment angle, the roll direction attachment angle, and the yaw direction attachment angle.

3. The positioning apparatus according to claim 2, wherein the program further performs processes of coordinate-transforming the triaxial accelerations detected at an identical time for all combinations of a plurality of the angles in the yaw direction, the pitch direction attachment angles, and the roll direction attachment angles within a predetermined angle range, and calculating as the yaw direction attachment angle the angle in the yaw direction in a case where an acceleration in a longitudinal direction of the moving body among the triaxial accelerations after the coordinate transformation, and the longitudinal acceleration which has been calculated have a highest match.

4. The positioning apparatus according to claim 1, wherein
the program further performs processes of calculating a normal acceleration which is an acceleration in a normal direction orthogonal to a longitudinal direction of the moving body based on the speed which has been calculated and the yaw angle obtained from the triaxial angular velocity after the coordinate transformation, coordinate-transforming the triaxial angular velocities which have been detected based on the pitch direction attachment angle, the roll direction attachment angle, and a predetermined angle in a yaw direction, and further calculating as a yaw direction attachment angle of the positioning apparatus the angle in the yaw direction in a case where an acceleration in a lateral direction orthogonal to the longitudinal direction of the moving body among the triaxial accelerations after the coordinate transformation and the normal acceleration match, and the program further performs a process of coordinate-transforming the triaxial accelerations based on the pitch direction attachment angle, the roll direction attachment angle, and the yaw direction attachment angle.

5. The positioning apparatus according to claim 4, wherein the program further performs processes of coordinate-transforming the triaxial accelerations detected at an identical time for all combinations of a plurality of the angles in the yaw direction, the pitch direction attachment angles, and the roll direction attachment angles within a predetermined angle range, and calculating as the yaw direction attachment angle the angle in the yaw direction in a case where an acceleration in the lateral direction orthogonal to the longitudinal direction of the moving body among the triaxial accelerations after the coordinate transformation, and the normal acceleration have a highest match.

6. The positioning apparatus according to claim 5, wherein, when the angle in the yaw direction in a case where the acceleration in the lateral direction orthogonal to the longitudinal direction of the moving body among the triaxial accelerations and the normal acceleration have a highest match, and the angle in the yaw direction in a case where the acceleration in the longitudinal direction of the moving body among the triaxial accelerations, and the longitudinal acceleration which has been calculated having a highest match are identical, the program further performs a process of calculating the angle in the yaw direction as the yaw direction attachment angle.

7. The positioning apparatus according to claim 6, wherein the program is capable of setting the angle range and a resolution of the angle in the yaw direction within the angle range.

8. The positioning apparatus according to claim 1, wherein the program further performs processes of coordinate-transforming the triaxial angular velocities which have been detected and the triaxial accelerations which have been detected based on the pitch direction attachment angle, the roll direction attachment angle, and a predetermined angle of a yaw direction, calculating attitude angles including a pitch angle, a roll angle, and a yaw angle based on the triaxial angular velocities and the trial accelerations after the coordinate transformation, and further calculating as a yaw direction attachment angle of the positioning apparatus the yaw angle in a case where any of the calculated attitude angles based on the triaxial angular velocities and the attitude angles based on the triaxial accelerations match, and the program further performs a process of coordinate-transforming the triaxial angular velocities based on the pitch direction attachment angle, the roll direction attachment angle, and the yaw direction attachment angle.

9. The positioning apparatus according to claim 8, wherein the program further performs processes of coordinate-transforming the triaxial accelerations which have been detected and the triaxial angular velocities detected at an identical time for all combinations of a plurality of the angles in the yaw direction, the pitch direction attachment angles, and the roll direction attachment angles within a predetermined angle range, calculating the attitude angles based on the triaxial angular velocities after the coordinate transformation, calculating the attitude angles of at least one of the pitch angle, the roll angle, and the yaw angle based on the trial acceleration after the coordinate transformation, and calculating as a yaw direction attachment angle of the positioning apparatus the yaw angle in a case where the calculated attitude angles based on the triaxial angular velocities and the attitude angles based on the triaxial accelerations have a highest match.

10. The positioning apparatus according to claim 9, wherein, when at least two or more of the angle in the yaw direction in a case where an acceleration in a lateral direction orthogonal to a longitudinal direction of the moving body among the triaxial accelerations, and a normal acceleration which is an acceleration in a normal direction orthogonal to the longitudinal direction have a highest match, the angle in the yaw direction in a case where the acceleration in the longitudinal direction of the moving body among the triaxial acceleration, and the longitudinal acceleration which has been calculated have a highest match, and the yaw angle in a case where the pitch angle, the roll angle, or the yaw angle based on the triaxial angular velocities, and one of the pitch angle, the roll angle, and the yaw angle based on the triaxial accelerations having a highest match are identical, the program further performs a process of calculating the angle in the yaw direction or the yaw angle as the yaw direction attachment angle.

11. The positioning apparatus according to claim 10, wherein the program is capable of setting the angle range and a resolution of the angle in the yaw direction within the angle range.

12. The positioning apparatus according to claim 8, wherein the program further performs processes of estimating the current position of the moving body based on the moving distance and the attitude angle, and correcting the current position of the moving body based on the positioning result according to respective prediction errors of the positioning result, the moving distance, and the attitude angle.

13. The positioning apparatus according to claim 12, wherein the program further performs a process of calculating the prediction error of the attitude angles based on a difference between the attitude angles based on the triaxial accelerations and the attitude angles based on the triaxial angular velocities.

14. A positioning method which is used by a positioning apparatus of a moving body, the method comprising:

receiving a radio wave from a GPS satellite, calculating at least a current position of the moving body and triaxial speeds including a longitudinal direction speed, a lateral direction speed, and a vertical direction speed, which are speeds of three axes orthogonal to each other in the positioning apparatus, and outputting a calculation result as a positioning result;

outputting a pulse signal corresponding to movement of the moving body;

detecting triaxial angular velocities which are angular velocities of the three axes orthogonal to each other in the positioning apparatus;

detecting triaxial accelerations which are accelerations of the three axes orthogonal to each other in the positioning apparatus;

calculating a moving distance, a speed, and a longitudinal acceleration of the moving body based on the pulse signal output per certain cycle;

determining whether or not the moving body is performing horizontal plane uniform linear traveling for linearly traveling at a uniform speed on a horizontal plane, based on at least the triaxial speeds calculated as the positioning result, the calculated longitudinal acceleration, and the detected triaxial accelerations while the moving body is traveling, and calculating the triaxial accelerations as a zero point when a determination is made that the moving body is performing the horizontal plane uniform linear traveling;

calculating a pitch direction attachment angle and a roll direction attachment angle of the positioning apparatus attached to the moving body based on the zero point of the calculated triaxial accelerations;

coordinate-transforming the detected triaxial angular velocities based on the calculated pitch direction attachment angle and the calculated roll direction attachment angle; and estimating the current position of the moving body based on at least a yaw rate obtained from the triaxial angular velocities after the coordinate transformation.

\* \* \* \* \*